United States Patent [19]

Yamaoka

[11] Patent Number: 5,130,812
[45] Date of Patent: Jul. 14, 1992

[54] APPARATUS FOR RECORDING ON A DISK AN AUDIO SIGNAL THAT IS RECORDED AFTER THE RECORDING OF A VIDEO SIGNAL THEREON

[75] Inventor: Katsumi Yamaoka, Saitama, Japan
[73] Assignee: Sony Corporation, Tokyo, Japan
[21] Appl. No.: 462,749
[22] Filed: Jan. 9, 1990

[30] Foreign Application Priority Data

Jan. 20, 1989 [JP] Japan .................................. 1-12475
Jan. 20, 1989 [JP] Japan .................................. 1-12476
Jan. 20, 1989 [JP] Japan .................................. 1-12477

[51] Int. Cl.5 ............................................ H04N 5/781
[52] U.S. Cl. .................................... 358/335; 358/341; 358/342; 358/909; 360/19.1; 360/35.1
[58] Field of Search ............... 358/335, 341, 906, 909, 358/342, 343; 360/35.1, 19.1

[56] References Cited

U.S. PATENT DOCUMENTS 4,531,161 7/1985 Murakoshi .
4,680,647 7/1987 Moriyama .......................... 358/343
4,947,265 8/1990 Hayashi et al. ..................... 358/341
4,965,675 10/1990 Hori et al. ........................... 358/341

FOREIGN PATENT DOCUMENTS 223423 5/1987 European Pat. Off. .
295148 12/1988 European Pat. Off. .

OTHER PUBLICATIONS

Patent Abstracts of Japan vol. 6, No. 140 (E-121)[0118] Jul. 29, 1982 & JP-A-57 65078 (Canon) Apr. 20, 1982.

Primary Examiner—Robert L. Richardson
Attorney, Agent, or Firm—Alvin Sinderbrand; William S. Frommer

[57] ABSTRACT

Apparatus for recording a still video picture signal and an audio signal on a disk, comprising an after-recording switch manually operable to initiate the recording of an audio signal on the disk, and a controller which responds to the operation of the after-recording switch to control the recording of the audio signal.

35 Claims, 18 Drawing Sheets

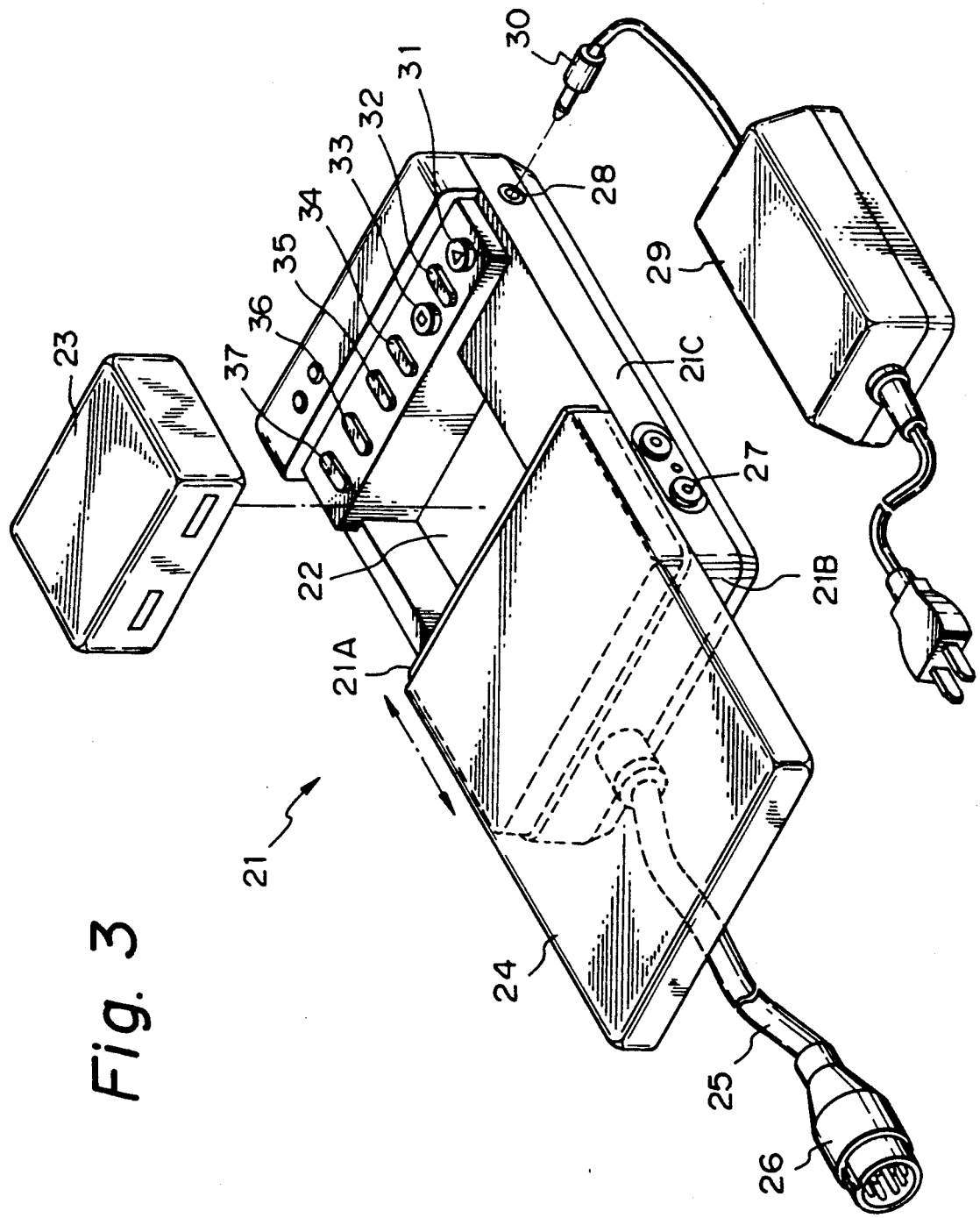

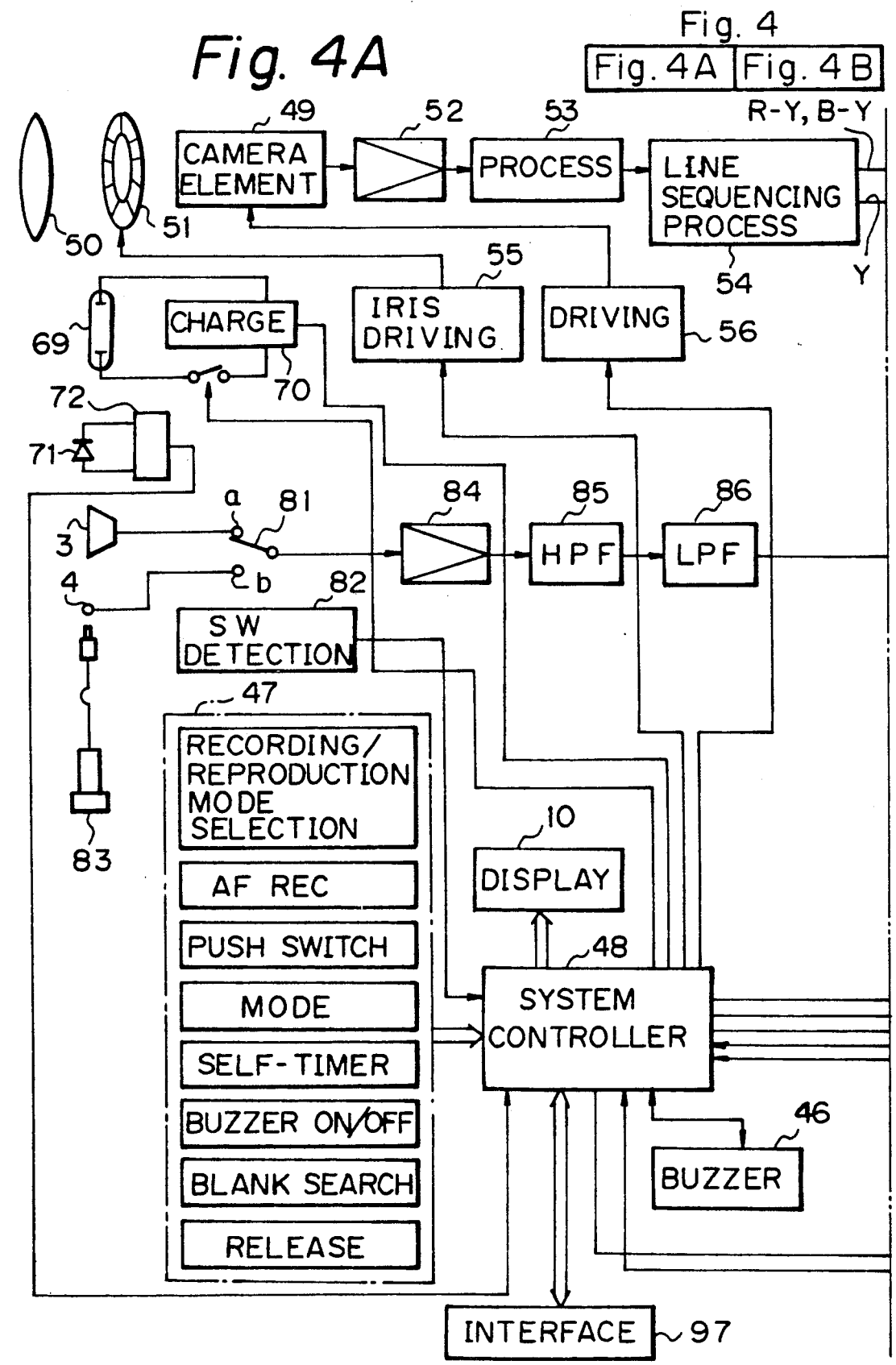

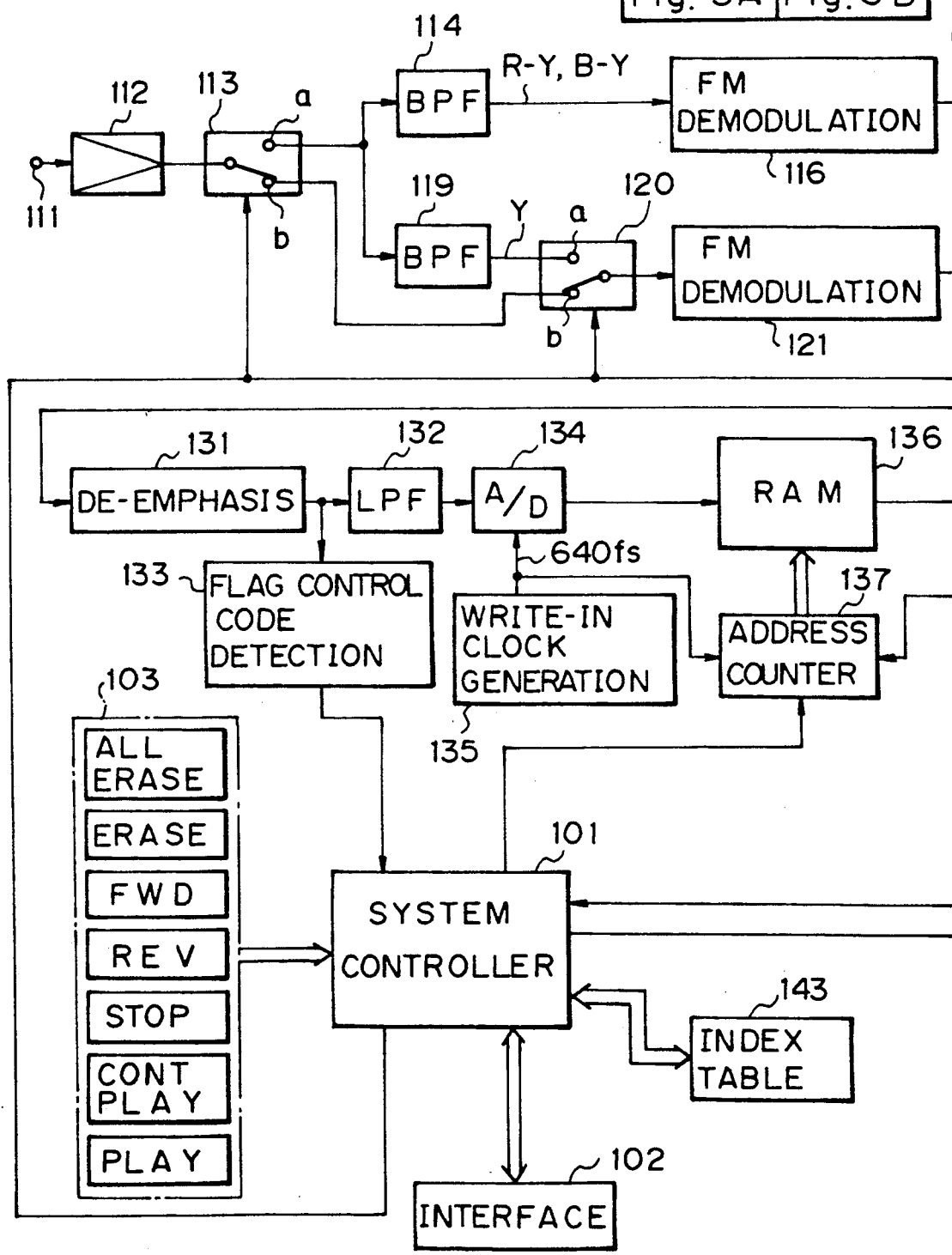

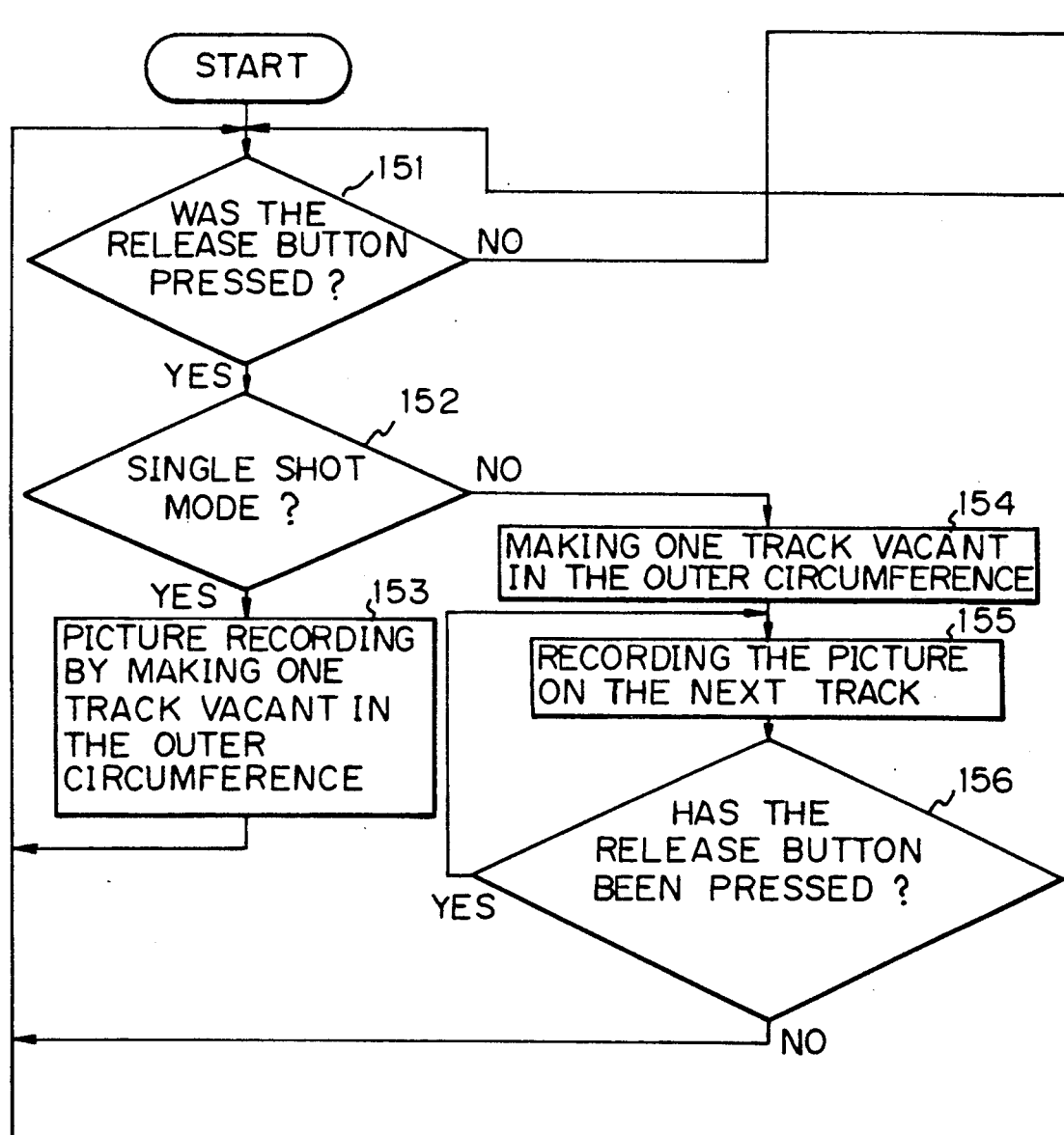

| Fig. 8A | Fig. 8B |

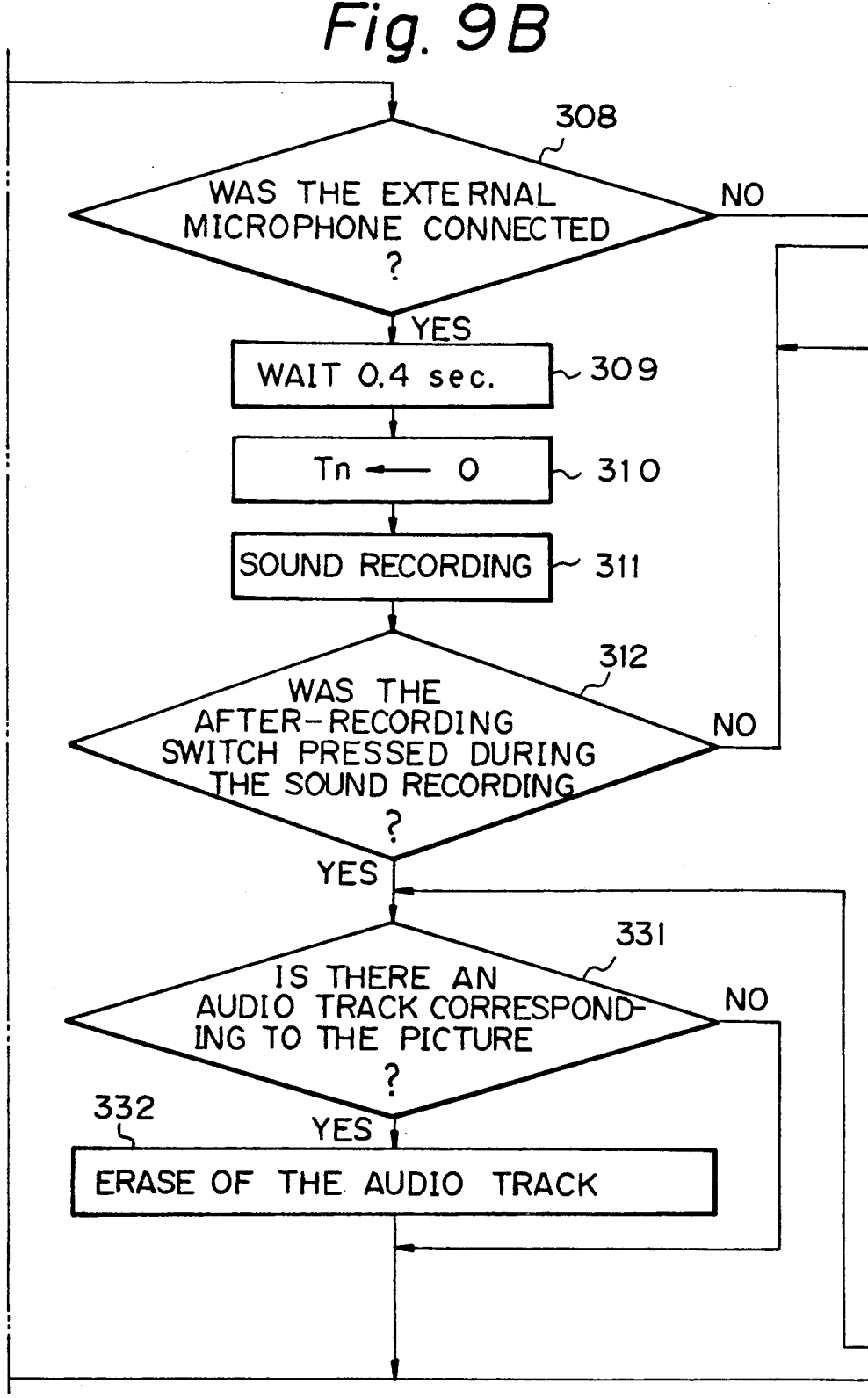

APPARATUS FOR RECORDING ON A DISK AN AUDIO SIGNAL THAT IS RECORDED AFTER THE RECORDING OF A VIDEO SIGNAL THEREON

BACKGROUND OF THE INVENTION

1. Field of the Invention

This invention relates to still video recording/playback apparatus and, more particularly, to such apparatus wherein an audio signal may be recorded on a disk at virtually any time following the recording thereon of a still video picture.

2. Description of the Prior Art

Electronic still cameras are known in which a still picture is recorded as a video signal on a magnetic disk. The "instantly recorded" picture may be played back with the use of a playback adapter and displayed, either as a video picture on a television monitor or as a "printed" hard copy picture. While the camera alone is used to record a still video picture on the disk, successful play back is accomplished by connecting the camera to the aforementioned playback adapter. The camera reproduces signals from the disk; and these reproduced signals are processed by the adapter into conventional television signals for display on a conventional television monitor.

Recently, improvements to the still video camera have been proposed, wherein audio signals which relate to the still picture may be recorded on the same disk. For example, a brief narrative explaining the picture, the subjects, the environment, etc., may be recorded as an audio signal and may be linked to the still video picture such that, when the video picture is played back, the recorded narrative likewise may be reproduced. In, for example, Japanese Laid-Open Patent Publication No. 62-99972 and in Japanese Laid-Open Patent Publication No. 62-95079, an audio signal spoken for a predetermined duration (e. g. on the order of five seconds, or ten seconds, or twenty seconds) may be time-base compressed and then recorded in a track on the same disk as was used for recording the still video picture Advantageously, the audio signal is recorded after the recording of the still picture; and this post-recording (or, as is sometimes used herein, the after-recording) process may be carried out immediately after the still video picture is recorded or at a later time, such as when the still video picture is reproduced and displayed.

In the aforementioned audio recording still video camera, the time limit during which the user may record his audio signal is on the order of about ten seconds. That is, an audio signal duration of ten seconds may be recorded. However, if the user does not successfully complete his audio recording in this time limit, for example, if the user does not compose his thoughts successfully, or if the user becomes "tongue-tied", the ten second duration may expire before the user completes his audio recording. It is expected that, during normal operation of the audio recording still video camera, incomplete or unsuccessful audio recording will not be uncommon. In the still video camera proposed heretofore, means are not provided for erasing the incomplete (or unsuccessful) audio signal to enable a subsequent audio recording to be made. It is, therefore, desirable to erase the audio signal from the disk or, for those audio recording still video cameras that employ a memory chip to store temporarily the audio signal, as may be used for time-base compression, to erase the audio signal from memory.

The camera proposed heretofore also does not enable the user of the audio recording still video camera to interrupt an audio recording operation and instantly record a still video picture if the opportunity arises. Heretofore, when an audio recording operation was initiated, it normally had to be completed before a video picture recording operation could begin. Thus, a momentary photographic opportunity may be lost.

In a typical audio recording still video camera, a built-in microphone is provided in the camera housing to facilitate audio recording. However, since the microphone is housed in the same case as the mechanical assemblies which are used in the video and audio signal recording operations, namely, the disk drive, mechanical noises generated by the assemblies are likely to be picked up by the microphone when an audio recording operation is carried out. It is desirable to avoid, or at least minimize such mechanical noises by interrupting the disk drive operation when an audio signal is supplied to the microphone. For example, for the embodiment wherein the audio signal is stored temporarily in a solid-state memory, operation of the disk drive may be interrupted while the audio signal is written into the memory and then resumed when the audio signal is read out and recorded. However, this interruption of the disk drive is not satisfactory when the audio signal is recorded while displaying a video signal. In that event, continual operation of the disk drive is needed to reproduce the still video picture signal from the disk. If the disk drive is stopped so as to minimize mechanical noises, the video signal terminates, thus blanking the displayed video picture and making it difficult, if not impossible, for the user to provide an acceptable narrative of that picture.

OBJECTS AND SUMMARY OF THE INVENTION

Therefore, it is an object of the present invention to provide apparatus for recording still video picture and audio signals on a disk which overcomes the aforenoted drawbacks and disadvantages.

Another object of this invention is to provide still video and audio recording apparatus which permits an audio signal to be recorded immediately after a still video picture is recorded or after a still video picture is reproduced.

A further object of this invention is to provide still video and audio recording apparatus which facilitates the recording of an audio signal in the event that an attempted recording is incomplete or otherwise unsuccessful.

An additional object of this invention is to provide apparatus of the aforenoted type which is readily and easily over from an audio recording mode to a video recording mode to enable the user to seize a photographic opportunity.

Still another object of this invention is to provide apparatus of the aforenoted type in which an audio signal recording operation may be initiated while a still video picture is reproduced and displayed, without mixing mechanical and other noises in the audio signal.

Yet another object of this invention is to provide still video and audio recording apparatus which may be used to record an audio signal generated from either a built-in microphone or an externally connected microphone.

Various other objects, advantages and features of the present invention will become readily apparent from the ensuing detailed description, and the novel features will be particularly pointed out in the appended claims.

In accordance with one embodiment of this invention, apparatus is provided for recording a still video picture signal and an audio signal on a disk, including an after-recording switch manually operable to initiate the recording of an audio signal after a video signal has been recorded, and a controller responsive to the operation of the after-recording switch to control the recording operation of the audio signal.

As one aspect of this embodiment, a delay is imparted to the recording of the audio signal such that the audio signal is not recorded for a predetermined time interval following the operation of the after-recording switch.

In accordance with another aspect of this embodiment, the controller includes an input for receiving the audio signal, a time compressor for time compressing the received audio signal and a recorder for recording the time compressed audio signal on the disk. As a feature of this aspect, the time compressed audio signal is recorded in a track adjacent the track in which the still video picture is recorded. As yet another feature of this aspect, a video mode selector is operable to select a one-picture recording mode for recording signals representing one still video picture in a track, or a continuous recording mode for recording successive tracks of still video pictures. When the one-picture recording mode is selected, the time compressed audio signals are recorded in a track adjacent the track in which the still video picture signals are recorded; and when the continuous recording mode is selected, the time compressed audio signal is recorded in a track adjacent the first of the successive video tracks.

As yet another aspect of this embodiment, if the after-recording switch is operated while the audio signal is being received, time compressed or recorded, an audio signal recording operation is recommenced to permit a new audio signal to be recorded. As a feature of this aspect, the track reserved for the previous audio signal is erased, thus preparing it to record a new audio signal. As yet another feature, the apparatus includes a release switch manually operable to initiate the recording of a still video picture signal; the operation of this release switch during an audio recording operation being effective to erase the track reserved for the audio signal, thus permitting a new audio signal to be recorded in that track. As a still further feature, the release switch may be partially or fully operated. If partially operated, the aforementioned track erase operation is carried out. If fully operated during an audio recording operation, that operation is overridden and a still video picture signal recording operation is commenced immediately.

As yet another aspect of this invention, the disk on which the video and audio signals are recorded is rotated by a disk drive whose operation is inhibited while an audio signal is supplied for recording, thereby minimizing the mixture of mechanical noise with that audio signal.

As yet another aspect of this invention, the apparatus includes a built-in microphone as well as an external microphone connection, and a selector switch operable to couple the built-in microphone or the external microphone to the audio recording circuitry. As a feature of this aspect, a still video picture signal may be played back from the disk while that disk is rotated by a disk drive; and if the built-in microphone is selected for coupling audio signals to the audio recording circuitry, the disk drive is interrupted while the audio signal is written to a temporary memory and then resumed when that memory is read to the disk. However, if the external microphone is selected, there is no interruption in the operation of the disk drive.

In accordance with another embodiment of this invention, apparatus is provided to reproduce a still video picture signal from a disk and, subsequent to such reproduction, an audio signal may be recorded on the same disk. Upon actuating a recording switch to establish an audio signal recording mode, audio signals may be supplied for recording either from the built-in microphone or from the external microphone. The manner in which the disk is driven to record the audio signal is a function of whether the built-in or external microphone is connected.

As one aspect, if the recording switch is operated while an audio signal is being written into or read from the memory, the memory is prepared to store a new audio signal; and the track in which the previous audio signal was or was about to be recorded is erased, thus preparing that track to store the new audio signal.

BRIEF DESCRIPTION OF THE DRAWINGS

The following detailed description, given by way of example, and not intended to limit the present invention solely thereto, will best be understood in conjunction with the accompanying drawings in which:

FIG. 3 is a perspective view of a playback adapter which may be connected to the camera of FIG. 1 to play back previously recorded video and audio signals;

FIGS. 4A and 4B are a block diagram of one embodiment

FIG. 5A and 5B are a block diagram of one embodiment of circuitry included in the camera shown in FIG. 1; of circuitry included in the adapter shown in FIG. 3;

FIGS. 6A–6E comprise a flow chart which is useful in explaining the operation of the camera system controller when recording an audio signal on the disk;

FIGS. 9A–9D comprise a flow chart which is useful in understanding the manner in which an audio signal is recorded after a still video picture signal is played back by the adapter shown in FIG. 3.

DETAILED DESCRIPTION OF PREFERRED EMBODIMENTS

Figure 1:
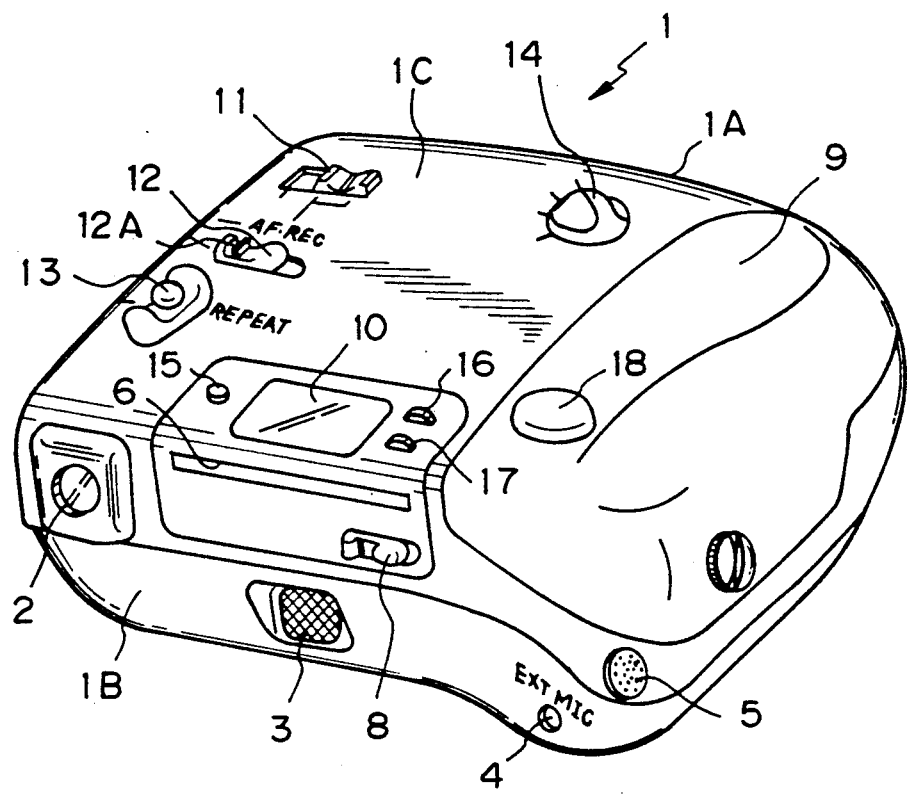
FIG. 1 is a perspective view of one embodiment of a still video camera with which the present invention may be used.

Referring now to the drawings, and in particular to FIG. 1, there is illustrated one embodiment of a still video camera, referred to herein as an electronic still camera, in which the present invention finds ready application. Camera 1 is provided with an outer casing whose front portion 1A includes an aperture (not shown) through which a photographic lens may be exposed to an external image or scene to be photographed. The front portion also is provided with an electronic flash unit (not shown) to irradiate the image.

Another aperture in the front portion exposes an objective lens to the image being photographed, this objective lens being used by the user as a view finder 2 provided in rear portion IB of camera 1.

A photosensor (not shown) also is provided on the front portion of the camera to sense the quantity of light emitted by the electronic flash. When a proper amount of light is sensed, the flash unit is turned off. A mode switch 14 is located on upper portion 1C of camera 2 and, in one embodiment, is comprised of a rotary switch having several contacts, or detents. Switch 14 is used to select a desired operating mode, such as a power off mode, a single frame photographing mode or a continuous, or successive frame photographing mode. In the power off mode, electrical power is not supplied to the operating components of camera 1, thereby placing the camera in an OFF state. In the single frame photographing mode, only one image or frame is photographed in response to each depression of a shutter release button 18. In the continuous photographing mode, successive images are recorded while the shutter release button is depressed.

Camera 1 also includes a cover 9 detachably mounted to the camera housing on which shutter release button 18 is disposed. The shutter release button includes first and second switches which are actuated sequentially when the button is depressed. When shutter release button 1 is partially depressed, the first switch is operated to supply electrical power to an image sensor and to recording elements (such as a disk drive) included in camera 1. When button 18 is depressed further, the second switch is operated to carry out an image recording operation. Thus, the purpose of the first switch is to establish a stand-by condition immediately before the actual image recording operation is performed. This stand-by condition conserves power, which is particularly helpful when the power source of camera 1 is a battery.

Cover 9 shields a recess which is adapted to receive a rechargeable battery pack or, alternatively, one or more primary batteries for supplying electrical power to the operating components included within camera 1.

Top portion IC of camera 1 also is provided with a self-timer button 15 which cooperates with shutter release button 18 to carry out a time delayed imaging operation. For example, if self-timer button 15 is depressed and then shutter release button 18 also is depressed, a timed picture taking operation is initiated.

Top portion 1C also is provided with a display 10 for displaying various data to the user of camera 1. This display may be similar to many LCD displays commonly found in conventional photographic cameras recently introduced. Display 10 also provides information useful in the audio recording operation which may be effected by the user of camera 1 after a still video picture is recorded or after a previously recorded still picture is displayed. Indications are provided by display 10 when, for example, an audio signal which is in the process of being recorded or, alternatively, which has been recorded, is erased. For example, a display E may be provided to indicate this audio erasure. Still further, LCD display 10 furnishes the user with a warning indication that only a predetermined number of tracks remain on the recording disk (shown in FIG. 2) for recording video or audio signals.

An audible indicator switch 16 is provided on top portion 1C of camera 1 and is manually operable to enable or disable an audible indicator, such as a buzzer. Switch 16 may be thought of as an ON/OFF switch which, when set in its ON state enables the buzzer to issue audible warnings which, as will be described below, indicate both the beginning of an audio recording operation and the expiration of a preset interval during which audio information may be recorded.

A switch 17 is illustrated adjacent ON/OFF switch 16 and is adapted, when operated, to enable the recording of a video signal on the next available (or "blank") track on the record disk of a still video picture.

Figure 2:
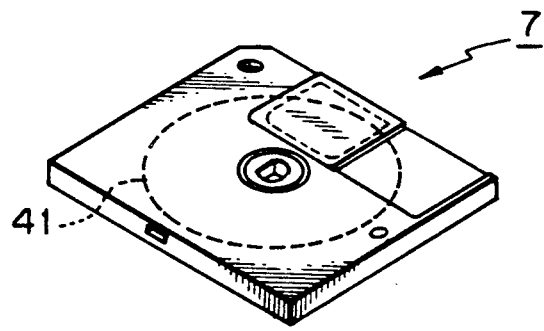
FIG. 2 is a perspective view of a video disk cassette which may be used with the camera of FIG. 1.

Rear portion 1B of camera 1 is provided with an insertion port 6, formed as a slit adapted to receive a magnetic disk cassette 7, shown in FIG. 2. Cassette 7 preferably is embodied as a magnetic disk 41 housed within a suitable jacket. The jacket is formed of a synthetic resin and, as illustrated, exhibits a square, box-like shape. Magnetic disk 41 is rotatably supported within the jacket and is adapted to be rotatably driven by a suitable disk drive assembly disposed within camera 1. The jacket includes a pair of apertures, only one of which is illustrated, through which record/playback heads are inserted into magnetic contact with disk 41. These apertures are covered by a slidable shutter which is driven by elements included within camera 1 so as to slide to its opened and closed positions.

An EJECT button 8 is provided on rear portion 1B and is adapted, when operated, to eject cassette 7 from camera 1 through port 6.

A connector 5, such as a multi-pin socket, also is provided on rear portion 1B and is adapted to receive a connector cable for electrically connecting camera 1 to an electronic playback adapter 21, shown in FIG. 3.

The camera also is provided with a built-in microphone 3 for recording audio signals on disk 41 either immediately after a still video picture is recorded or at some later time, such as when that video picture is reproduced and displayed. As will be described, the audio signal which, typically, is used to provide a narrative of a particular still picture on a track, is recorded on a track associated with that in which the still picture signal is recorded For example, a track adjacent a video picture track may be reserved for the audio signal associated with that video picture.

An external microphone jack 4 also is provided on rear portion 1B of camera 1 and is adapted to receive a plug from an external microphone. In one embodiment, microphone jack 4 is mechanically connected to a microphone selector switch such that, when a plug is inserted into this jack, the switch couples audio signals derived from the external microphone to audio signal recording circuitry. In the absence of this plug, the selector switch couples the audio signals derived from built-in microphone 3 to the audio recording circuitry.

Returning to top portion 1C of camera, additional switches 11, 12 and 13 are illustrated. Switch 11 functions as a selector switch to establish an audio recording mode of operation. Preferably, switch 11 is formed as a slide switch having three positions adapted to select three respective modes of operation: muting, after-recording and simultaneous recording. When switch 11 is set in the muting mode, audio signals are not recorded on disk 41. When this switch is set to select the after-recording mode, an audio signal may be recorded on disk 41, either by way of microphone 3 or by way of an external microphone, at some time following the recording of a still video picture This after-recording operation is carried out in response to the actuation of switch 12, the latter functioning as a sound recording switch. In a preferred embodiment, a predetermined time duration is reserved for recording an audio signal; and in one example, this time duration is equal to approximately 9.6 seconds. Thus, the audio signal to be recorded may exhibit a time duration of not more than 9.6 seconds. As will be described, the audio signal is time compressed by a factor of 640, thus resulting in the compression of a 9.6 second audio signal to an interval on the order of about 15 milliseconds.

If selector switch 11 is set to its simultaneous recording mode, the aforementioned 9.6 second time duration during which an audio signal may be recorded is initiated promptly following the completion of a video recording operation. As will be described, in both the after-recording and simultaneous recording modes, suitable warning indications are provided to notify the user that an audio signal is about to be recorded, thus suggesting that the user begin to talk.

Recording switch 12 preferably is constructed as a slide switch having a projection 12A adapted to be moved by the user. A slide operation of switch 12 is preferred because it requires conscious, deliberate effort by the user, thus preventing, or at least minimizing, inadvertent or erroneous operation. That is, a sound recording operation is not carried out unless and until the user activates switch 12.

Switch 13 functions as a pushbutton switch and is adapted to initiate an audio repeat operation. During a playback mode, that is, when previously recorded audio information is played back from disk 41, the actuation of switch 13 serves to repeat the playing back of the audio signal. In one embodiment, the audio signal is repeated in response to each actuation of switch 13. In another embodiment, a single actuation of this switch serves to provide repeated reproduction of the audio signal until the switch is pressed once again.

Switch 13 also functions as an auxiliary stand-by switch during a picture-recording operation. That is, when camera 1 is conditioned to record a still video picture, such as when it is not connected to a playback adapter, the actuation of switch 13 performs an operation similar to that of the partial depression of shutter release button 18. Thus, actuation of switch 13 initiates the operation of the disk drive assembly to rotate disk 41, and supplies electrical power to the image sensor and recording elements included in camera 1. In this stand-by state, the camera is conditioned to record a still picture signal immediately upon the operation of shutter release button 18 because there is no need to delay the recording operation so as to permit the rotation of disk 41 to "come up to speed". Consequently, the sudden appearance of a photographic opportunity may be seized immediately.

It should be noted that aforementioned mode switch 14 is operably associate with selector switch 11 to the extent that if the mode switch is operated to select a continuous photographing mode but selector switch 11 is operated to establish a simultaneous audio recording mode, the continuous photographing mode is overridden. Rather, when selector switch 11 selects the simultaneous recording mode, a single photographing mode is selected notwithstanding the setting of mode switch 14 to the continuous photographing position.

As mentioned above, camera I is adapted to be connected by way of connector 5 to a playback adapter of the type shown in FIG. 3. When connected to the playback adapter, shutter release button 18 functions as a playback switch which, when actuated, plays back a new frame of previously recorded still video picture signal from disk 41. Thus, successive actuations of button 18 serve to play back successive still pictures.

Turning to FIG. 3, playback adapter 21 is illustrated as generally rectangular having an outer casing which houses signal processing circuitry. Adapter 21 includes a recess 22 adapted to receive a rechargeable battery pack 23 or, alternatively, one or more primary batteries for supplying electrical power to the signal processing circuitry. A slide cover 24 slidably engages a groove formed on the casing of adapter 21 and is adapted to cover recess 22 and battery 23.

A ledge is provided adjacent recess 22 on which are disposed various selector buttons 31-37. These selector buttons include a frame feed selector 31 which, when actuated, reproduces a new still picture signal from disk 41. Thus, successive operation of selector button 31 serves to reproduce successive still video pictures, one picture at a time. Selector 32 functions as a continuous selector button which, when operated, reproduces a given still video picture for a predetermined period of time. For example, when selector 32 is operated, a still video picture is reproduced for five seconds.

Selector 33 functions as a STOP button, selector 34 operates as a REVERSE button, selector 35 operates as a FORWARD button and selector 36 functions as an ERASE button which, when operated, erases one still video picture from disk 41. Hence, I successive actuations of ERASE button 36 serves to erase the still video picture signals, one picture at a time. Finally, selector 37 functions as an AUTOMATIC ERASE button which, when operated, serves to erase all of the signals (both video and audio) which may be recorded on disk 41.

As shown, selector buttons 31-37 are concealed when cover 24 slides to its closed position.

A connecting cable 25 extends from end portion 21B of adapter 21 and terminates in a plug 26 adapted to be inserted into socket 5 of camera 1. Electrical connections between the camera and adapter furnish still video picture signals and audio signals reproduced from disk 41 for display and for audible sound reproduction.

Adapter 21 also includes an output terminal 27 disposed on side portion 21C for supplying to an external monitor or television display picture signals which are produced in response to still video picture signals played back from disk 41 in camera 1. For example, adapter 21 includes signal processing circuitry to supply NTSC signals to the monitor coupled to terminal 27 so that a still image may be reproduced and displayed thereon.

Adapter 21 also includes a DC input terminal 28 adapted to receive a plug 30 of an AC adapter 29. When the AC adapter is connected to AC mains, it produces and supplies DC power to playback adapter 21 by means of plug 30 and DC input terminal 28.

Figure 4B:
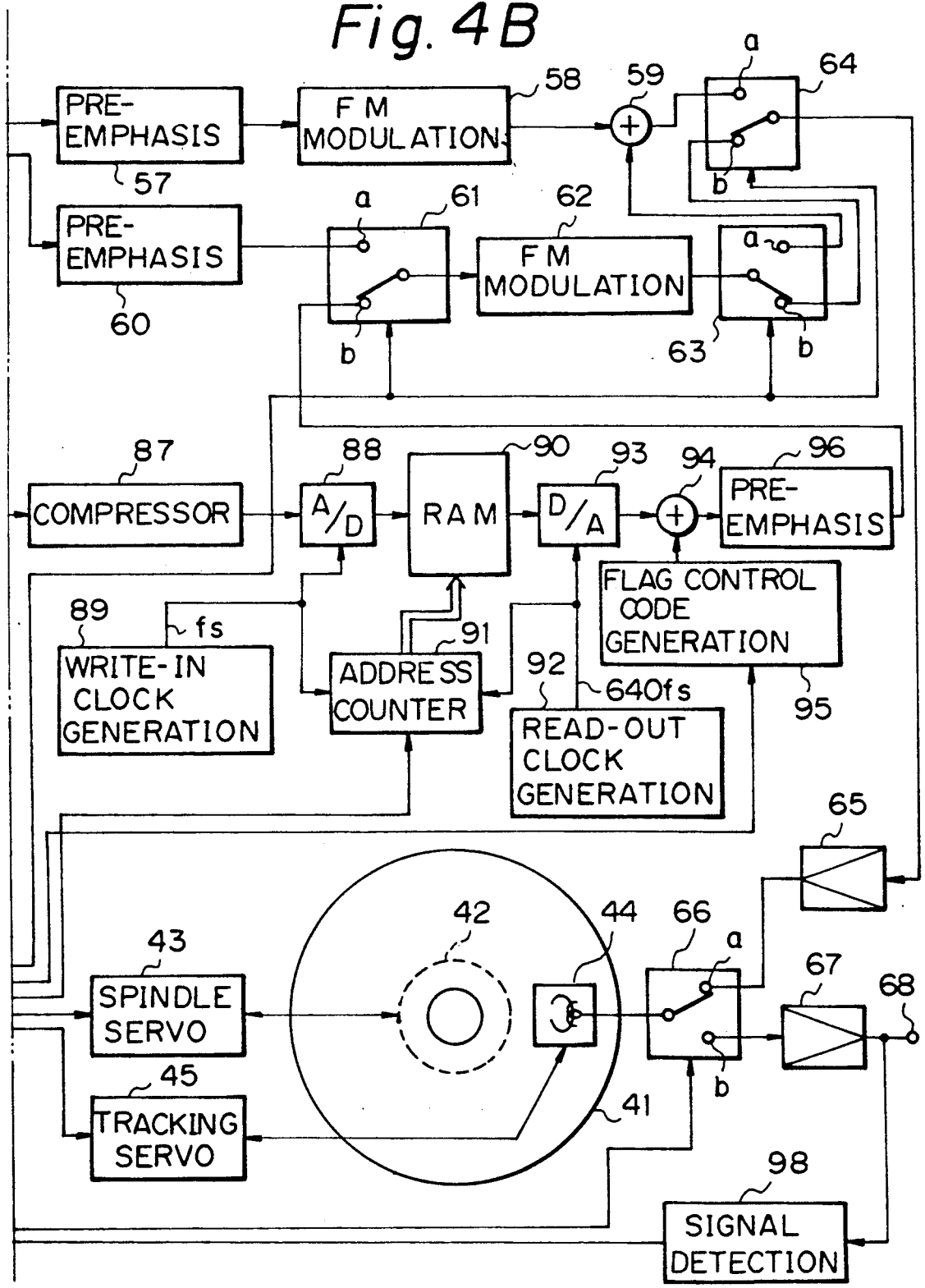

Turning now to FIGS. 4A and 4B, one embodiment of the electrical circuitry which comprises camera 1 is illustrated. As shown particularly in FIG. 4B, disk 41 is adapted to cooperate with a disk drive including a spindle motor 42 which, when operated, rotates disk 41 to permit video and audio signals to be recorded thereon and reproduced therefrom. A spindle servo 43 is coupled to spindle motor 42 and operates to control the rotation of motor 42 in response to signals supplied to the spindle servo by a system controller 48. Spindle servo 43 forms no part of the present invention per se.

System controller 48 (FIG. 4A) may include a conventional microprocessor and is responsive to the operation of switches 47, which represent the various switches provided on camera 1. It will be seen that switches 47 include selector switch 11, after-recording switch 12, repeat switch 13, mode selector switch 14, self-timer switch 15, ON/OFF switch 16, track searching switch 17 and shutter release button 18. Depending upon which of switches 47 is operated, system controller 48 controls the video and audio recording and playback operation.

System controller 48 also is coupled to liquid crystal display 10 to control the display of various warnings and other information, described generally above. A buzzer 46, or other audible indicator, also is connected to the system controller to provide audible warning indications, as will be described below.

The system controller is coupled to selector switches 61, 63 and 64, all shown in FIG. 4B, which operate as video/audio selectors. More particularly, each of these selector switches is shown with a movable contact adapted to be coupled to a terminal for recording a video signal, or to a terminal b for recording an audio signal. Although electromechanical switches are illustrated, it will be appreciated that switches 61, 63 and 64 may be comprised of other conventional electronic switching devices. In any event, system controller 48 is adapted to produce a "video" select signal to dispose selector switches 61, 63 and 64 in their respective video select modes (i. e. each movable contact engages terminal a), and to produce an "audio" select signal to dispose each of these selector switches in its respective audio select mode (i. e. the movable contact engages terminal b).

The system controller also is coupled to a record/playback selector switch 66 (FIG. 4B) which selectively couples a record/playback head 44 to recording or playback circuitry, respectively. Selector switch 66 may be similar to selector switches 61, 63 and 64 and is illustrated as having a movable contact selectively engageable with a record terminal a or a playback terminal b, depending upon the record/playback select signal produced by system controller 48.

A video recording channel is comprised of a photodetector 49, which may be formed as CCD or MOS devices adapted to generate electrical signals in response to a light image focused thereon by means of a lens 50 and an adjustable aperture 51, and a line sequencing processing circuit 54. Circuit 54 is coupled to photodetector 49 by means of an amplifier 52 and a signal processor 53. The line sequencing processing circuit functions to generate red color difference signals (R−Y) and blue color difference signals (B−Y) in successive (or sequential) horizontal line intervals. In addition, a luminance component Y is produced by circuit 54 for each line interval. The line sequential red and blue color difference signals (R−Y) and (B−Y) are supplied to a frequency modulator 58 by means of a pre-emphasis circuit 57. Similarly, the luminance component Y produced by line sequencing processing circuit 54 is coupled to a frequency modulator 62 via selector switch 61 by means of a pre-emphasis circuit 60. Frequency modulated color difference signals and frequency modulated luminance signals are summed by a summing circuit 59 coupled to frequency modulator 58 and, by way of selector switch 63, to frequency modulator 62. The summed FM color difference and luminance signals are supplied by selector switch 64 and record/playback selector switch 66 to magnetic head 44 by way of recording amplifier 65.

An audio recording channel is comprised of a microphone selector switch 81 which is adapted to couple built-in microphone 3 or an external microphone 83 (which may be connected to microphone jack 4) to a dynamic range compressing circuit 87 (FIG. 4B). Selector switch 81 is schematically illustrated as an electromechanical switch which may be operated by, for example, the insertion of a microphone plug into jack 4. That is, when external microphone 83 is not connected, switch 81 couples the built-in microphone to the dynamic range compressor. However, when the external microphone is coupled to jack 4, switch 81 is changed over to couple external microphone 83 to dynamic range compressor 87. The condition of switch 81 is sensed by a switch detector 82 which, in turn, is coupled to system controller 48 to supply a suitable signal thereto representing the connection of the internal or external microphone to the audio recording channel.

Switch 81 is coupled to dynamic range compressor 87 by way of an amplifier 84, a high pass filter 85 and a low pass filter 86, the filters functioning to band-limit the audio signal supplied to the dynamic range compressor. Compressor 87 is known to those of ordinary skill in the art as being adapted to eliminate, or at least minimize, noise that may be present in the input audio signal.

As shown in FIG. 4B, compressor 87 is coupled to an analog-to-digital (A/D) converter 88 which functions to digitize the range-compressed audio signal. In this regard, A/D converter 88 is coupled to a sampling clock generator 89 which supplies a sampling clock signal of frequency $f_s$ to the A/D converter.

A/D converter 88 is coupled to an addressable memory, such as a random access memory (RAM) 90 such that each digitized sample is stored in a respective memory location. An address counter 91 is coupled to RAM 90 to generate a suitable address into which each digitized sample is written. As shown, address counter 91 is coupled to clock generator 89 such that the generated addresses are incremented in response to each sampling clock pulse of frequency $f_s$.

The digitized audio samples stored in RAM 90 are read out therefrom and supplied to a digital-to-analog (D/A) converter 93. Address counter 91 is used to read out the contents of the RAM; and as illustrated, address counter 91 is coupled to a read clock generator 92 which is adapted to generate read clock pulses of a frequency $640f_s$. It will be appreciated that, since digitized samples are written into RAM 90 at the write-in rate of $f_s$ and are read from the RAM at the read-out rate of $640f_s$, the digitized audio signal is time-base compressed by a factor of 640. This time-base compressed audio signal is converted to analog form by D/A converter 93 and supplied via a summing circuit 94 to a pre-emphasis circuit 96. Summing circuit 94 also is coupled to a flag control and code generator 95 which, in turn, is driven by system controller 48. As is described in copending application Ser. No. 07/462,728, filed Jan. 9, 1990 generator 95 serves to provide useful information pertaining to the audio recording operation, such as the identity of the track in which the audio signal is recorded, the identity of the track in which is recorded the video signal to which this audio signal is linked, etc. As an example, the time-base compressed audio signal may occupy an interval on the order of about 15 milliseconds, and the flag control and code information produced by generator 95 may occupy an interval on the order of about 1.5 milliseconds. In one embodiment, the flag control and code information precede the audio information for recording in a track on disk 41.

Pre-emphasis circuit 96 is coupled to frequency modulator 62 by way of the b terminal of selector switch 61. For an audio recording operation, the output of frequency modulator 62 is coupled to the b terminal of selector switch 63 and, by way of the b terminal of selector switch 64, to recording amplifier 65.

Figure 7A:
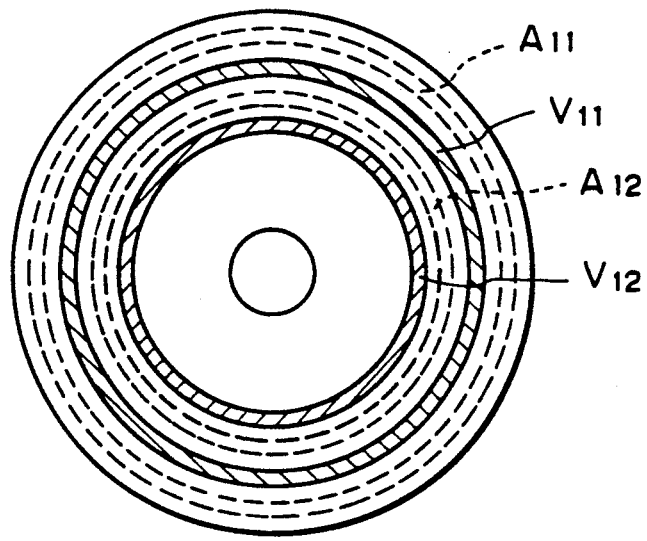
FIGS. 7A and 7B are schematic diagrams of a disk having video and audio signals recorded thereon.
Figure 7B:
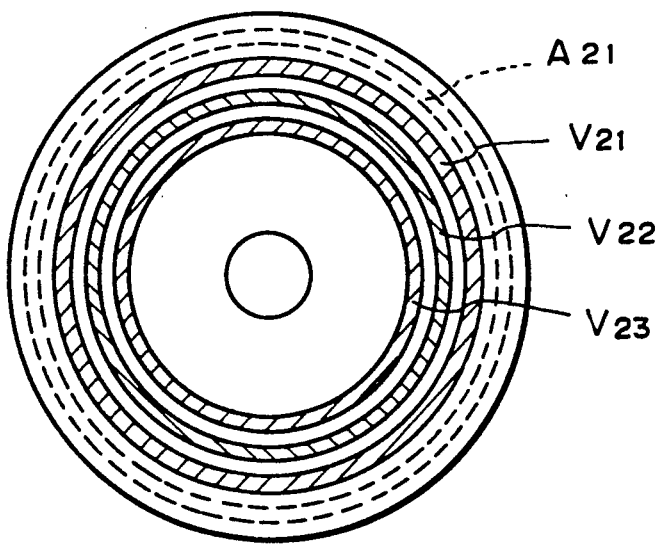

In operation, let it be assumed that the video recording channel is enabled, as by the partial depression of shutter release button 18 or the operation of switch 13, whereby spindle motor 42 is energized to drive disk 41. In addition, the imaging electronics and the video processing circuitry likewise are enabled. Let it be further assumed that recording switch 12 is not operated, thus conditioning selector switches 61, 63 and 64 to their video recording conditions. When shutter release button 18 is actuated fully, photodetector 49 generates color video signals corresponding to the image focused thereon through lens 50 and aperture (or iris) 51 The opening of this iris is controlled by a suitable iris driver 55, which may be a controlling motor, in response to control signals supplied thereto by system controller 48. The video signals produced by photodetector 49 are separated into line sequential red and blue color difference signals (R−Y) and (B−Y), and a luminance component Y by line sequencing processing circuit 54. The line sequential color difference signals are pre-emphasized, frequency modulated and summed with the luminance component which also is pre-emphasized and frequency modulated. At this time, selector switches 61 and 63 are in their video recording conditions, whereby the frequency modulated luminance component may be summed with the line sequential frequency modulated color difference signals in summing circuit 59. The summed line sequential and luminance signals are coupled by switch 64 to recording amplifier 65, and thence through record/playback switch 66 to head 44. Accordingly, the frequency modulated line sequential color difference signals and the frequency modulated luminance signals are recorded in a track on disk 41. An example of the recorded video track is illustrated in FIGS. 7A and 7B.

In the event that the still video picture requires the use of artificial illumination, a suitable flash is provided by a strobe discharge tube 69 (FIG. 4A) which is controlled by a discharge circuit 70 in response to a discharge signal produced by system controller 48. A photodiode 71 senses the strobe flash to supply a suitable light indicating signal to a detector 72. This detector is coupled to system controller 48 and supplies a signal to the system controller when the detected flash exhibits sufficient magnitude, whereby the system controller commands discharge circuit 70 to terminate the flash.

After the still video picture signal is recorded, as aforesaid, let it be assumed that audio recording switch 12 (FIG. 1) is operated. System controller 48 responds to the operation of switch 12 to change over selector switches 61, 63 and 64 to their respective audio record conditions. Let it be further assumed that external microphone 83 is not connected to camera 1 and, thus, microphone selector switch 81 couples built-in microphone 3 to dynamic range compressor 87. Audio signals derived from microphone 3 are amplified by microphone amplifier 84 and band-limited by cascaded high pass filter 85 and low pass filter 86. The resultant band-limited audio signals are range-compressed by compressor 87.

The range-compressed audio signal is digitized by A/D converter 88 (FIG. 4B) and stored temporarily in addressable locations of RAM 90. In the preferred embodiment, range compressed audio signals are digitized and stored in the RAM for a predetermined period of time. At the conclusion of this time period, the contents of RAM 90 are read out at an accelerated rate (as mentioned above, the read-out rate is 640 times the write-in rate) and digitized by D/A converter 93. Flag control and code information from generator 95 are inserted into the time-base compressed, analog audio signal by summing circuit 94. The resultant multiplexed information and audio signals are preemphasized, frequency modulated by FM modulator 62 and coupled to head 44 by way of selector switches 63, 64 and 66.

As will be described below, and for the reason discussed in copending application Ser. No. 07/462,728, filed Jan. 9, 1990, it is preferred to record the time-base compressed audio signal in a track adjacent the track in which the associated video signal was recorded. In one embodiment, the audio signal is recorded in the outer adjacent track when still video picture signals are recorded one frame at a time. For the operation of camera 1 wherein successive frames of still video picture signals are recorded continuously, such picture signals are recorded in successive tracks and the audio signal is recorded in the outer track adjacent the first of these successive picture signals.

When camera 1 is connected to playback adapter 21, the video and audio signals which had been recorded on disk 41 may be reproduced and displayed. The circuitry which comprises adapter 21 and the manner in which such circuitry operates will be described below in conjunction with FIGS. 5A and 5B. The following describes the operation of camera 1 during a playback mode.

When a playback operation is to be carried out, such as when camera 1 is connected to adapter 21, system controller 48 supplies a record/playback select signal to selector switch 66 (FIG. 4B) so as to couple head 44 to playback terminal b. It will be appreciated that system controller 48 of camera 1 is adapted to communicate with a similar system controller 101 provided in adapter 21 (shown in FIG. 5A) by way of interface circuits 97 and 102, respectively. Interface circuit 97 is coupled to system controller 48 and interface circuit 102 is coupled to system controller 101. Cable 25 serves to interconnect the interface circuits.

Previously recorded video and audio signals are reproduced from disk 41 by head 44 and supplied to an output terminal 68 by a playback amplifier 67. Output terminal 68 is coupled to an input terminal 111 (FIG. 5A) of playback adapter 21. This output terminal also is coupled to a signal detector 98 which detects the magnitude of the reproduced video and audio signals. The output of signal detector 98 is coupled to system controller 48 to supply a signal indicative of the tracking error of head 44 relative to the track being scanned— that is, the track from which the video and audio signals are reproduced. System controller 48 is coupled to a tracking servo 45 (FIG. 4B) which, in turn, mechanically adjusts the position of head 44 as a function of the detected amplitude of the reproduced signals. Thus, a closed servo loop is provided to maintain head 44 substantially over the center of the track being reproduced.

Figure 5B:
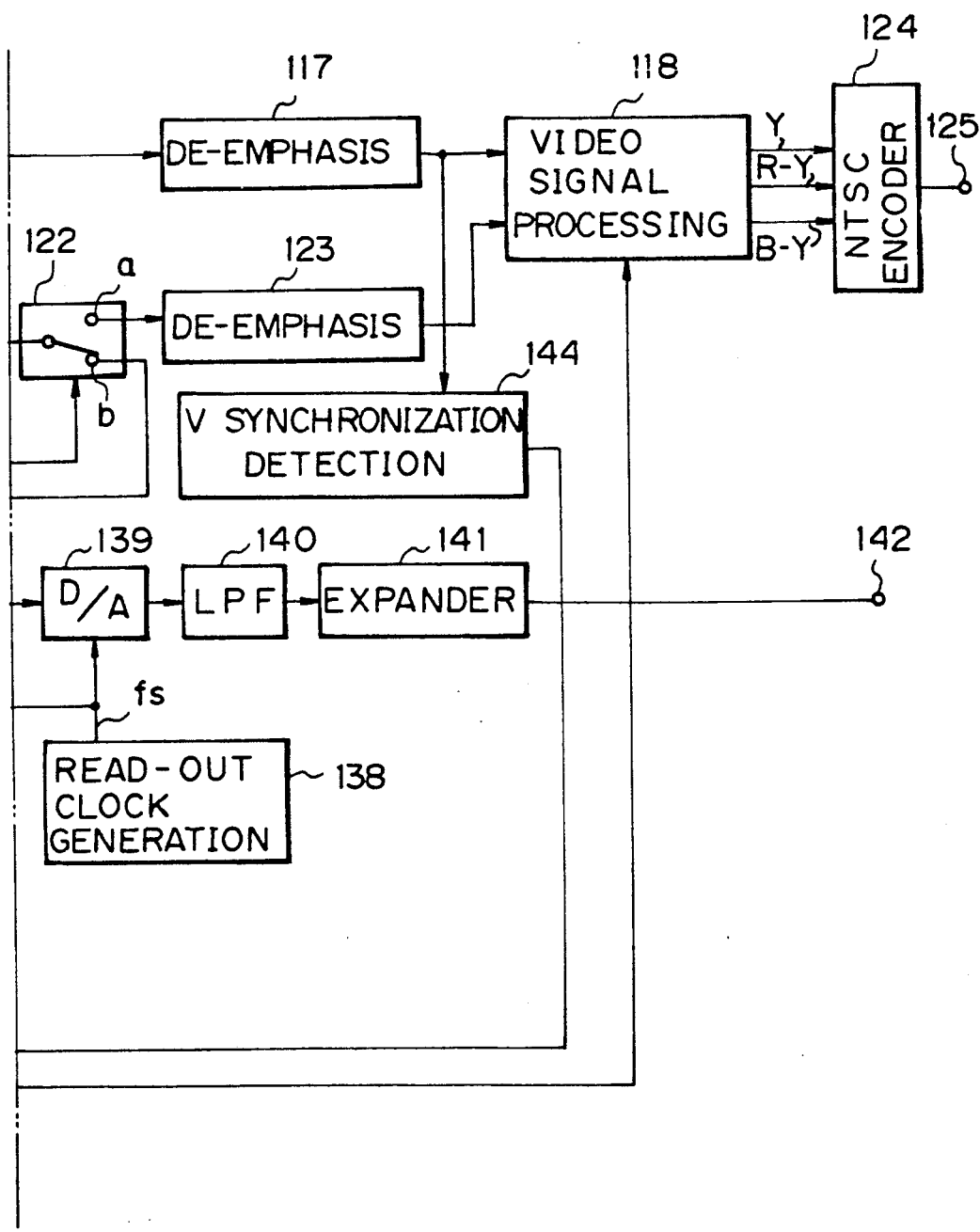

Referring now to FIGS. 5A and 5B, there is illustrated a block diagram representing the circuitry included in playback adapter 21 to reproduce both the still video picture signals and I the audio signals which may have been recorded previously on disk 41. It is recalled that those signals are supplied from the disk to input terminal 111 in FIG. 5A via playback amplifier 67 shown in FIG. 4B. Input terminal 111 is coupled through an amplifier 112 and a video/audio selector 113 to FM demodulators 116 and 121. Video/audio selector 113 may be similar to aforedescribed selector switch 63 having a video output terminal a and an audio output terminal b, either one being coupled to amplifier 112 under the control of system controller 101. Video output terminal a is coupled to FM demodulator 116 by way of a band pass filter 114; and this video output terminal also is coupled to FM demodulator 121 by another band pass filter 119. Band pass filter 114 is adapted to separate the line sequential color difference signals (R−Y) and (B−Y) from the signal reproduced from disk 41; and the frequency modulated color difference signals are demodulated by FM demodulator 116.

Band pass filter 119 is adapted to pass the luminance component Y included in the video signal reproduced from disk 41 to FM demodulator 121 by way of another video/audio selector 120, this selector being similar to aforedescribed selector switch 61 (shown in FIG. 4B). Here, the video/audio selector couples FM demodulator 121 either to its video input terminal a or to its audio input terminal b, the latter being coupled to the audio output terminal b of video/audio selector 113. It is appreciated that FM demodulator 121 serves to demodulate the frequency modulated luminance component Y or, alternatively, the frequency modulated time-compressed audio signal reproduced from disk 41.

Frequency demodulator 116 is coupled to a video signal processor 118 (FIG. 5B) by way of a de-emphasis circuit 117. The video signal processor also is coupled to the output of FM demodulator 121 by wa of yet another video/audio selector 122 and a de-emphasis circuit 123. Selector 122 may be similar to selector 113 and includes a video output terminal a coupled to de-emphasis circuit 123 and an audio output terminal b coupled to an audio de-emphasis circuit 131 (FIG. 5A). Selector 122 couples FM demodulator 121 to the video or audio output terminals in response to the control signal produced by system controller 101.

Video signal processor 118 (FIG. 5B) is adapted to regenerate red and blue color difference signals (R−Y) and (B−Y) for each line interval, notwithstanding the line sequential red and blue color difference signals which are supplied thereto from FM demodulator 116. Such a video signal processor is known to those of ordinary skill in the art, has been disclosed previously and, in the interest of brevity, is not described further herein. Suffice it to say that video signal processor 118 produces the luminance component Y, the red color difference signal (R−Y) and the blue color difference signal (B−Y) for each line interval. These individual components are coupled to a suitable encoder 124, such as an NTSC encoder, for producing a conventional NTSC composite color video signal at output terminal 125. This output terminal may be coupled to conventional television receiver to display the composite color video signal as a still video picture frame.

Audio output terminal b of video/audio selector 122 (FIG. 5B) is coupled to audio de-emphasis circuit 131 (FIG. 5A) whose output is connected to an analog-to-digital (A/D) converter 134 by way of a low pass filter 132. The output of de-emphasis circuit 131 also is coupled to a flag control and code detector 133 which functions to detect flag control and code information that had been multiplexed with the time-compressed analog audio signal recorded on disk 41, as mentioned above. The detected flag control and code information is supplied to system controller 101.

A/D converter 134 is supplied with sampling pulses by a write-in clock generator 135 adapted to generate sampling pulses of a frequency on the order of $640f_s$. Thus, the sampling pulses supplied to A/D converter 134 are of substantially the same frequency (or repetition rate) as the read clock pulses that had been used to read the digitized audio signals from memory 90 to disk 41, as discussed above in conjunction with FIG. 4B.

A/D converter 134 is coupled to a RAM 136 which operates to store each digitized sample in an addressable location. An address counter 137 is coupled to RAM 136 to generate successive addresses in response to the write-in clock pulses supplied thereto by write-in clock generator 135. It is appreciated that the address generated by address counter 137 is incremented in response to each write-in clock pulse.

RAM 136 is coupled to a digital-to-analog (D/A) converter 139 (FIG. 5B) which functions to read the digitized samples stored in this memory and convert those samples to analog signal levels. The contents of RAM 136 are read from each address location determined by address counter 137 which generates read-out addresses in response to read-out clock pulses generated by a read-out clock generator 138. The read clock rate of this read-out clock generator is equal to $f_s$ which, it is appreciated, is equal to the write-in clock rate used to write the original digitized audio samples into RAM 90 (FIG. 4B) during an audio recording operation. Thus, by reading the digitized samples from RAM 136 at a much slower rate than those digitized samples are written thereinto, the time-compressed audio signal read from disk 41 is time-base expanded to its original time base. The digitized audio samples of restored time base are converted to analog form by D/A converter 139 under the control of read-out clock pulses of frequency $f_s$; and these analog samples are filtered by a low pass filter 140 and supplied to a dynamic range expander 141. It is recalled that the dynamic range of the original audio signals supplied to RAM 90 of FIG. 4B had been compressed by range compressor 87. Range expander 141 (FIG. 5B) serves to return the recovered analog audio signal to its original dynamic range. The resultant output analog audio signal is supplied to an output terminal 142 from which it may be coupled to a suitable sound transducer to reproduce the audible information which had been recorded previously on disk 41. Thus, the narrative associated with a particular still video picture will be heard.

System controller 101, shown in FIG. 5A, is coupled to 11 and is responsive to the actuation of any one of switches 31–37 provided on playback adapter 21 (FIG. 3). These switches are represented in FIG. 5A as a bank of switches 103. As mentioned above, system controller 101 communicates with system controller 48 (FIG. 4A) by wa of an interface circuit 102 which is coupled to interface circuit 97 (included in camera 1) by cable 25 (FIG. 3).

An index table 143 is coupled to system controller 101 and is adapted to identify those tracks in which still video picture signals and those tracks in which audio signals are recorded, and also to identify the particular still video picture with which a recorded audio signal is associated, or linked. System controller 101 responds to the flag control and code information removed from the reproduced audio signal by detector 133 to generate index table 143 in the, manner described in copending application Ser. No. 07/462,728, filed Jan. 9, 1990.

In operation, when a still video picture signal is reproduced from a track, system controller 101 sets each of the video/audio selectors to its video input or output terminal a, respectively. Thus, a still video picture signal reproduced from disk 41 by head 44 is coupled to input terminal 111 (FIG. 5A) from which the still video picture signal is filtered by band pass filters 114 and 119 and FM demodulated to produce the line sequential color difference signals (R−Y) and (B−Y) and also the luminance component Y. These signals are de-emphasized by deemphasis circuits 117 and 123 (FIG. 5B) and reconstituted into color difference and luminance components for each line interval by video signal processor 118. The luminance and color difference components for each line interval are encoded by encoder 124 to a conventional NTSC signal supplied to output terminal 125. As a result, the still video picture may be displayed by a conventional television receiver.

When an audio signal is reproduced from a track of disk 41, system controller 101 sets the video/audio selectors to their respective audio input or output terminals b. Accordingly, the time-compressed audio signal reproduced from disk 41 is coupled to input terminal 111 and, by way of selectors 113 and 120 (FIG. 5A), the audio signal is FM demodulated by demodulator 121. The demodulated audio signal then is de-emphasized and written into RAM 136 at the write-in rate of $640f_s$. In addition, the flag control and code information which had been multiplexed with the audio signal is detected by detector 133 and supplied to system controller 101 from which index table 143 is created.

After being written into RAM 136, the audio signal is read therefrom at the read-out rate $f_s$, thus restoring the time-compressed audio signal to its original time-base. The read out digitized audio signal is reconverted back to analog form by D/A converter 139 (FIG. 5B) and is range expanded by dynamic range expander 141. The resultant audio signal is provided at output terminal 142 and may be used to drive a suitable transducer to reproduce the audible narrative associated with a still video picture.

The manner in which an audio signal is recorded after the recording of a still video picture by camera 1 now will be described in conjunction with the flow charts shown in FIGS. 6A–6E. It will be appreciated that these flow charts represent the operation of system controller 48 (FIG. 4A). For convenience, this operation of recording the audio signal after the still video picture signal has been recorded is referred to as an after-recording operation.

It is assumed that selector switch 11 (FIG. I) is disposed in its after-recording position so as to enable the recording of an audio signal on disk 41. As controller 48 carries out its program, it enters the after-recording routine represented by the flow chart of FIGS. 6A–6E and initially inquires at 151 if shutter release button 18 is operated. If this inquiry is answered in the affirmative, the controller advances to inquire at 152 if mode switch 14 (FIG. 1) has been set to its single frame photographing mode. If so, a still video picture signal is recorded in an available track on disk 41 and, since selector switch 11 had been set to the after-recording mode, the next adjacent track at the outer circumference of the track in which the still video picture is recorded is made available for subsequent recording (i. e. for after-recording) of an audio signal. The routine then returns to inquiry 151.

If inquiry 152 had been answered in the negative, that is, if mode switch 14 had selected the continuous frame photographing mode, the controller advances to instruction 154 to reserve an available track for after-recording of an audio signal; and then instruction 155 is executed to record the still video picture signal in the track next adjacent the reserved track, preferably at the interior circumference of the reserved track. Then, inquiry 156 is made to determine if shutter release button 18 remains actuated and, if so, another still video picture signal is recorded on the next adjacent inner track. This operation continues, that is, the controller cycles through the loop formed of instruction 155 and inquiry 156, until the shutter release button 18 is released. At that time, inquiry 156 is answered in the negative and the controller returns to inquiry 151.

Thus, it is seen that, when camera I is disposed in its single frame photographing mode, a still video picture signal is recorded in one track and the next adjacent outer track is reserved for the recording of an audio signal. However, if the camera is disposed in its continuous frame photographing mode, successive frames of still video picture signals are recorded in successive tracks, and the outer track next adjacent the first of these video tracks is reserved for the after-recording of an audio signal.

FIGS. 7A and 7B are schematic representations of the manner in which the still video picture signals and audio signals are recorded in tracks on disk 41. FIG. 7A represents those tracks when camera I is operated in its single frame photographing mode. As shown, a still video picture signal is 21 recorded in track V and its next adjacent outer track $A_{11}$ is reserved for the after-recording of an audio signal. The next time that a still video picture signal is taken, that is, the next time shutter release button 18 is operated, a still video picture signal is recorded in track $V_{12}$; and its next adjacent outer track $A_{12}$ is reserved for the after-recording of an audio signal associated with the video signal in track $V_{12}$.

FIG. 7B illustrates the manner in which still video picture signals and an audio signal are recorded when camera 1 is operated in its continuous frame photographing mode. As illustrated, the first frame of a still video picture signal is recorded in track $V_{21}$, and the next outer track $A_{21}$ adjacent thereto is reserved for the after-recording of an audio signal. Of course, for so long as shutter release button 18 remains operated, still video picture signals are recorded in successive tracks $V_{22}$ and $V_{23}$. Thus, successive frames of still video pictures are recorded in tracks adjacent the first video track $V_{21}$, while the next outer track $A_{21}$ adjacent the first video track $V_{21}$ is reserved for the after-recording of the audio signal.

Although not shown or described herein, during normal operation, head 44 advances from the outermost track on disk 41 to the innermost track. Thus, the first frame of a still video picture signal is recorded on an outer track and, as successive frames of still video pictures are recorded, head 44 moves radially inward to record those successive frames on inner tracks. However, when camera I is operated with selector switch 11 set to its after-recording mode, the track reached by head 44 before recording a video signal is reserved for the after-recorded audio signal.

Let it be assumed that inquiry 151 of FIG. 6A is answered in the negative. That is, let it be assumed that shutter release button 18 is not operated. Controller 48 then advances to inquiry 157 of FIG. 6C to determine if sound recording switch 12 is operated. If not, the controller merely returns to inquiry 151.

Assuming, however, that the user actuates recording switch 12, the controller advances to instruction 158 by which an audible warning indication is provided for a predetermined period of time. For example, buzzer 46 (FIG. 4A) is actuated for a period on the order of 0.4 seconds. This provides sufficient warning to the user that the audio recording operation is about to begin.

After providing this audible indication, the controller advances to instruction 159 which imparts a 0.4 second delay into the actual recording operation. At the end of this delay, which provides sufficient time for the user to release recording switch 12, instruction 160 is carried out by which a timer is reset to an initial count of $T_n=0$. Then, instruction 161 is executed to carry out a sound recording operation.

The sound recording operation contemplates the receipt of an audio signal from either the built-in microphone or an external microphone connected to microphone jack 4. This audio signal is digitized, written into memory 90, read therefrom to time-compress it, and recorded on disk 41 as has been described above in conjunction with FIG. 4B.

While this audio recording operation is being carried out, the controller inquires, at 162, if recording switch 12 is operated once again while the audio signal is in the process of being written, read or recorded. If this inquiry is answered in the affirmative, the controller returns to inquiry 151 to restart the foregoing routine. Thus, the operation of recording switch 12 while an audio signal is in the process of being recorded terminates the recording operation while preparing the memory to store a new audio signal.

If inquiry 162 is answered in the negative, the controller advances to inquire, at 163 (FIG. 6D), if shutter release button 18 is partially depressed. It is recalled that, when this release button is partially depressed, a stand-by condition is established. If this inquiry is answered in the affirmative, the controller then advances to inquiry 172 to determine if shutter release button 18 is fully depressed. If not, the controller returns to inquiry 151 (FIG. 6A). Thus, the partial depression of the shutter release button has the same effect as the operation of recording switch 12 during an audio recording operation. That is, a sound recording operation may be terminated and then re-started when the recording switch or the shutter release button is operated before an audio signal is successfully recorded.

Figure 6B:
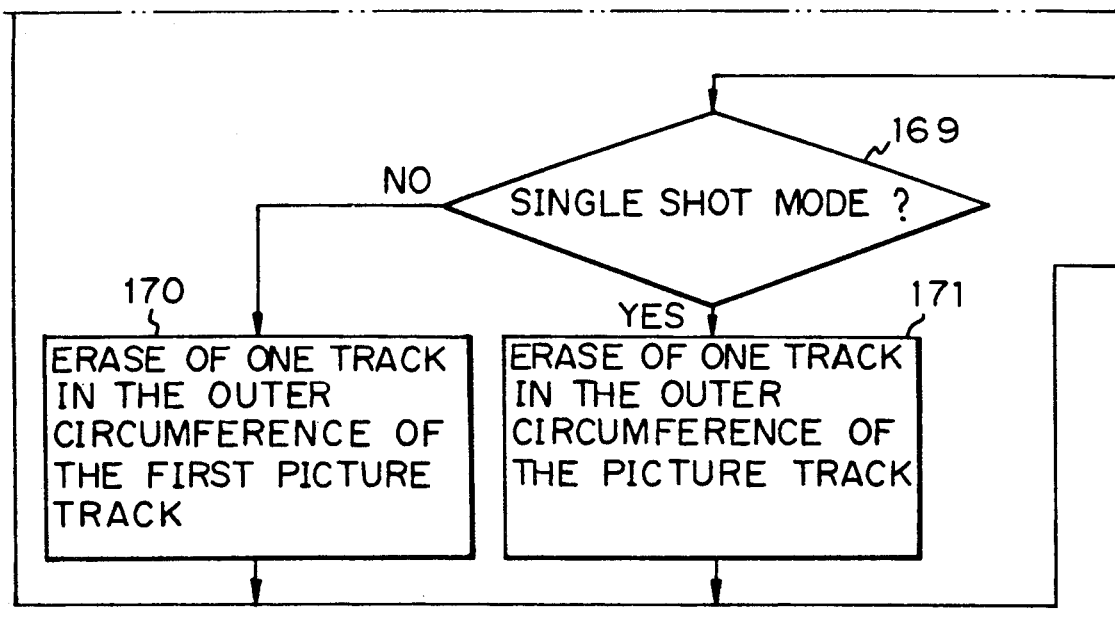
Figure 6C:
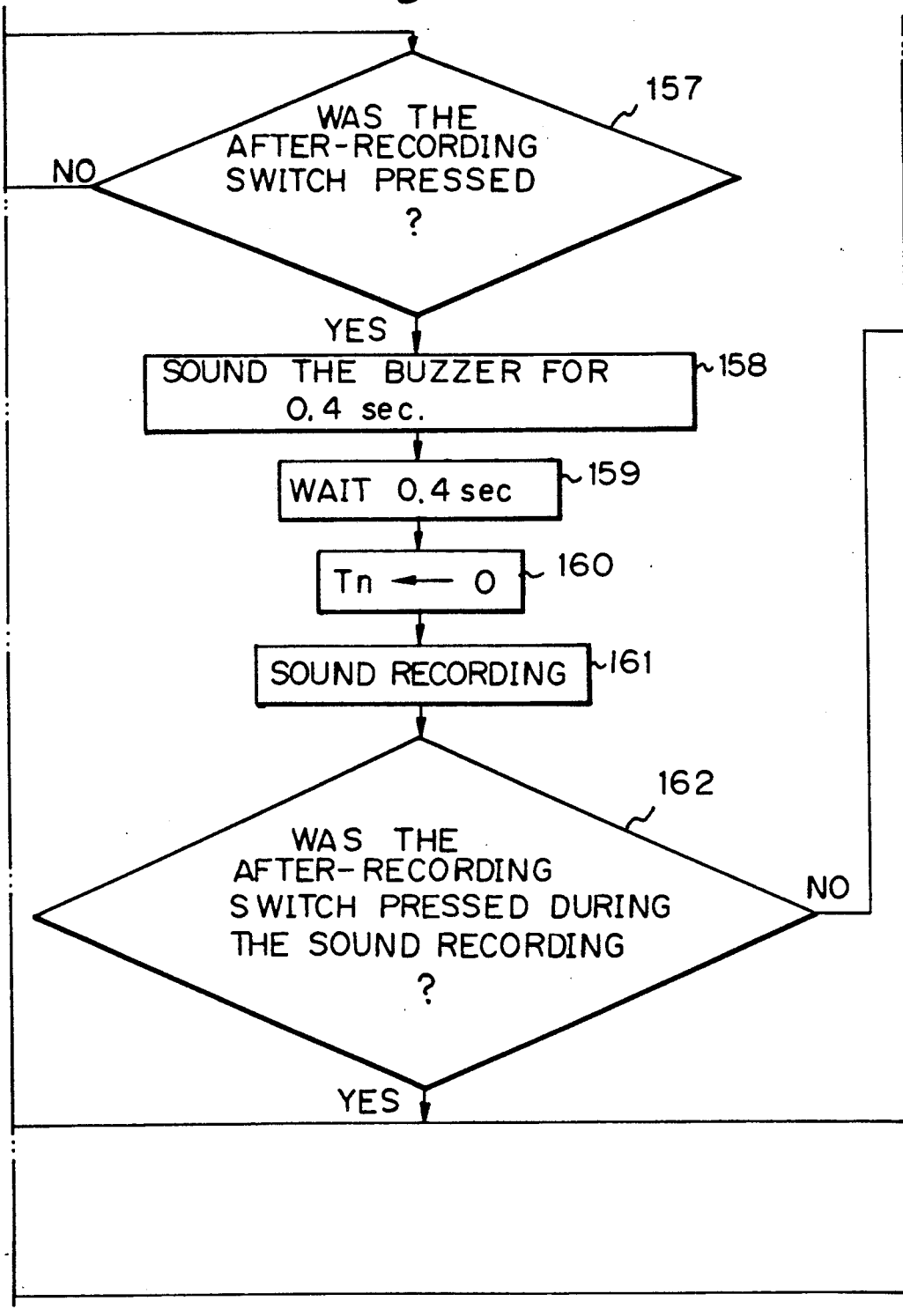
Figure 6D:
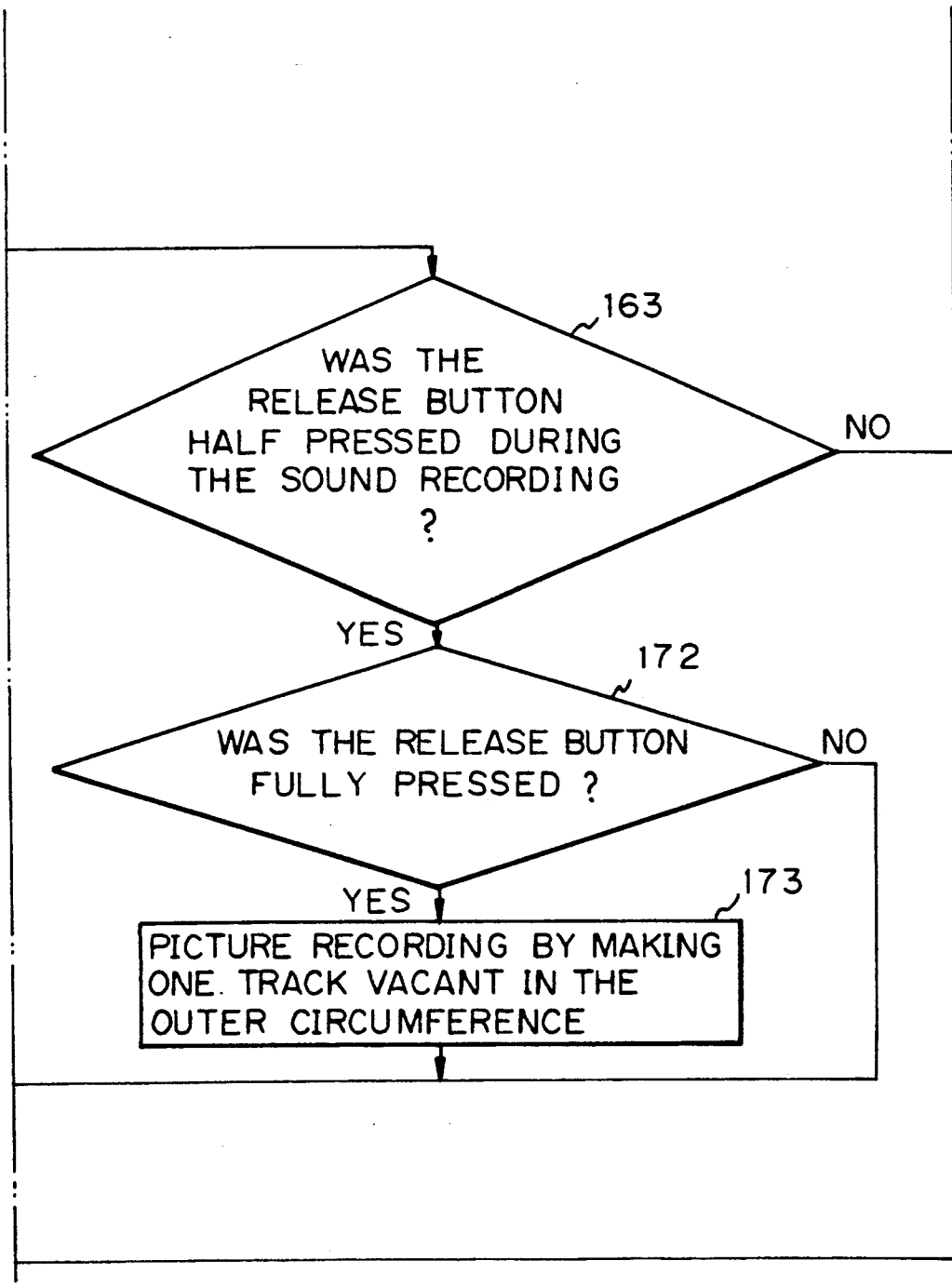
Figure 6E:
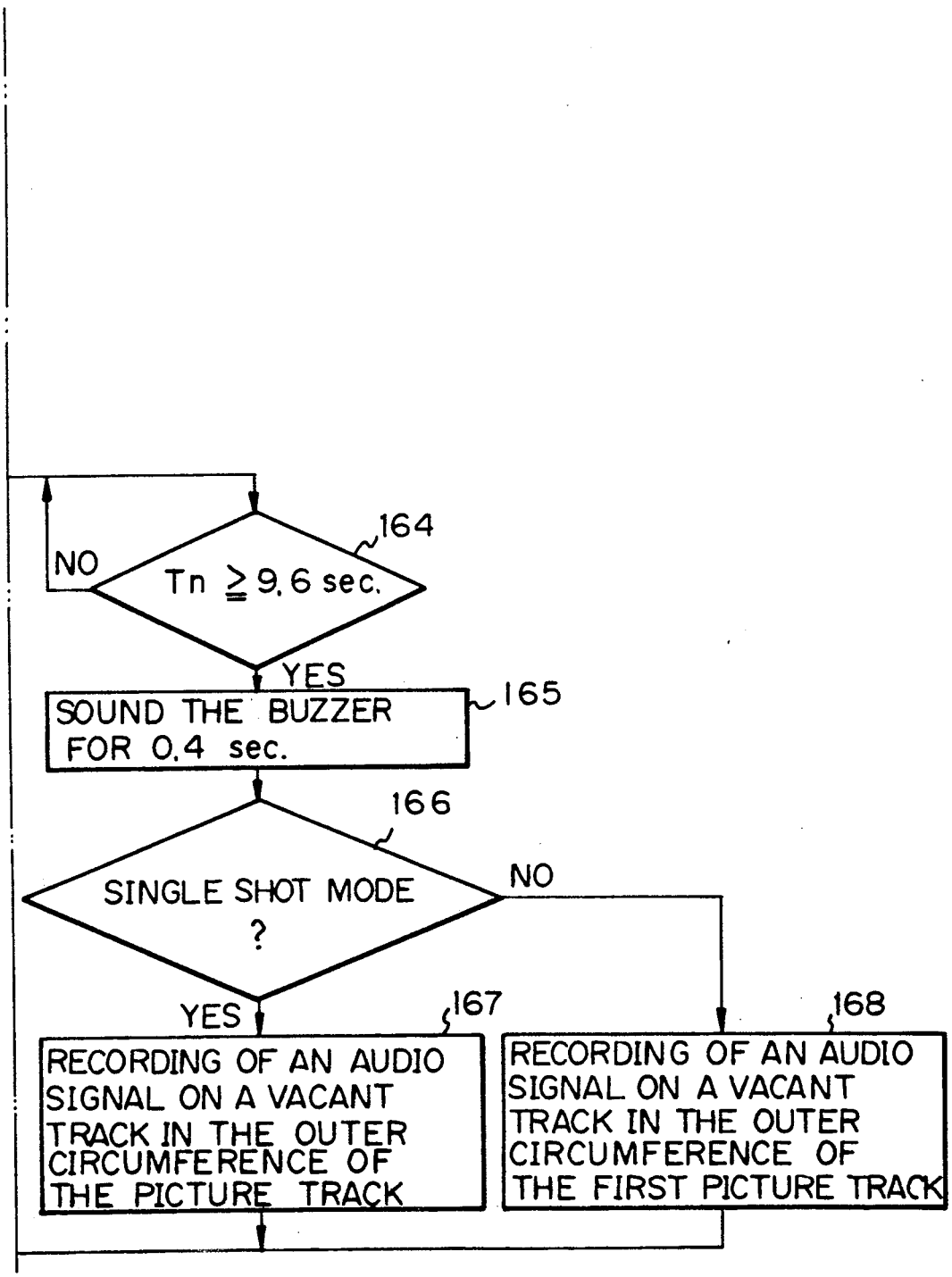

Assuming that the shutter release button is not partially depressed during an audio recording operation, inquiry 163 (FIG. 6D) is answered in the negative and the controller advances to FIG. 6E to inquire, at 164, if the timer $T_n$ has reached a predetermined time-out value. In the preferred embodiment, this predetermined value is on the order of about 9.6 seconds to permit the recording of an audio message of 9.6 seconds duration. If the timer has not yet timed out, the illustrated routine cycles through inquiry 164, as illustrated. However, once the timer times out, another audible indication is provided, at instruction 165. For example, buzzer 46 (FIG. 4A) is activated once again. At this time, the audio signal is about to be read from memory 90 and, thus, the audible sound emanating from buzzer 46 is not written into the memory.

Then, inquiry 166 is made to determine if mode switch 14 had established the single frame photographing mode. If so, the audio signal stored in memory 90 is read out and recorded in the track which had been reserved therefor by instruction 153 (discussed above in conjunction with FIG. 6A). Thus, after recording a still video picture signal, the audio signal associated therewith is recorded in the next adjacent outer track which had been reserved for that audio signal.

Alternatively, if mode switch 14 had selected the continuous frame photographing mode, inquiry 166 is answered in the negative; and the controller advances to instruction 168 to record the audio signal read from memory 90 in the outer track which had been reserved adjacent the first video track by instruction 154 (FIG. 6A). Thus, after recording successive frames of still video pictures, the audio signal associated with those frames is recorded in the reserved track adjacent the first of those still video pictures.

After the audio signal read from memory 90 is recorded, either by instruction 167 or by instruction 168, the controller returns to inquiry 151 to resume the illustrated routine.

Let it be assumed that recording switch 12 had been operated or shutter release button 18 had been partially depressed while an audio recording operation was in the process of being carried out. That is, before the audio signal written into memory 90 is read to disk 41, either recording switch 12 or shutter release button 18 is operated. As a result, either inquiry 162 (FIG. 6C) is answered in the affirmative or inquiry 172 (FIG. 6D) is answered in the negative. In either condition, the controller advances to inquiry 169, shown in FIG. 6B, to determine if mode switch 14 had selected the single frame photographing mode. If this inquiry is answered in the negative, the controller advances to instruction 170 to erase the outer track adjacent the first of successive tracks in which successive still video picture signals are recorded. That is, and with reference to FIG. 7B, track $A_{21}$ is erased. Consequently, if any audio signal had been recorded in this track at the time that recording switch 12 or shutter release button 18 is operated, that signal is erased and track $A_{21}$ is prepared for re-use with a new audio signal to be supplied by the user. Of course, if no audio signal had been recorded in track $A_{21}$, the track merely is conditioned for recording a new audio signal.

Alternatively, if mode switch 14 selects the single frame photographing mode, inquiry 169 is answered in the affirmative and the controller advances to instruction 171 to erase the outer track adjacent the track in which the associated still video picture signal had been recorded. Referring to FIG. 7A, if an audio signal associated with the still video picture signal recorded in track $V_{11}$ is in the process of being recorded when recording switch 12 or shutter release button 18 is operated, adjacent outer track $A_{11}$ is erased. If no audio signal had been recorded, the track simply is prepared for recording a new audio signal.

Similarly, if an audio signal associated with the still video picture signal recorded in track $V_{12}$ is in the process of being recorded, outer adjacent track $A_{12}$ is erased and conditioned to record a new audio signal.

From the foregoing, it is appreciated that a maximum time interval of, for example, 9.6 seconds, is provided for the recording of an audio signal. An audible indication is provided at the beginning of this interval to warn the user that an audio signal now may be recorded; and a similar audible indication is provided at the conclusion of that interval to apprise the user of the fact that the dedicated time interval for generating an audio signal has expired. Of course, the user need not produce an audio signal that extends for a full 9.6 second interval. Shorter messages may, of course, be recorded. However, if the user attempts to record a narrative that exceeds 9.6 seconds, the audible indication apprises him that a portion of his planned message will not be recorded.

It will be appreciated that the audio signal which is recorded in a track on disk 41 is a time-compressed audio signal. Of course, this audio signal is multiplexed with flag control and code information. In the foregoing description, it is assumed that recording switch 12 is operated after the recording of one frame (or after the recording of successive frames) of a still video picture signal but before another individual frame (or another series of successive frames) is recorded. Thus, after recording a still video picture frame, controller 90 advances head 44 to the outer track $A_{11}$ (FIG. 7A) or $A_{21}$ (FIG. 7B), adjacent the track in which the still video picture signal had just been recorded, depending upon whether the camera is operated in its single frame or continuous frame photographing mode, to record the audio signal.

It is expected that, during some audio recording operations, the user may not be satisfied with the message he is recording. For example, he may become flustered, or his message may be too long (e. g. more than 9.6 seconds) or he may not be able to compose his thoughts satisfactorily. In any event, the present recording operation with which he is not satisfied may be overridden by operating recording switch 12 or by partially depressing shutter release button 18. As discussed above, when the recording switch or shutter release button is operated, a new audio recording operation is initiated and any time-compressed audio signal which may have been recorded but with which the user is not satisfied is erased from disk 41.

While recording an audio signal, the user of camera 1 may be presented with a photographic opportunity. In that event, shutter release button 18 may be operated to record a still video picture signal of that photographic opportunity. As the controller carries out the routine discussed above, inquiry 163 of FIG. 6D is reached and answered in the affirmative. Then, inquiry 172 is made to determine if shutter release button 18 is fully depressed. The resultant operation if this inquiry is answered in the negative has been discussed above. But, if inquiry 172 is answered in the affirmative, the controller advances to instruction 173 by which head 44 is advanced radially inwardly so as to reserve an adjacent outer track for subsequent recording of an audio signal and then head 44 is moved further inwardly to the next adjacent track for recording the still video picture signal therein. Thus, a photographic opportunity is not missed and, moreover, a track is reserved for the subsequent recording of audio information associated with the still video picture signal which has just been recorded.

The foregoing has described the operation in which an audio signal is recorded in response to the actuation of recording switch 12. If selector switch 11 (FIG. I) is disposed in its simultaneous recording position, system controller 48 of camera 1 operates in accordance with the flow chart shown in FIGS. 8A–8B whereby an audio signal is recorded immediately after the recording of a still video picture.

Figures 8, 8A:
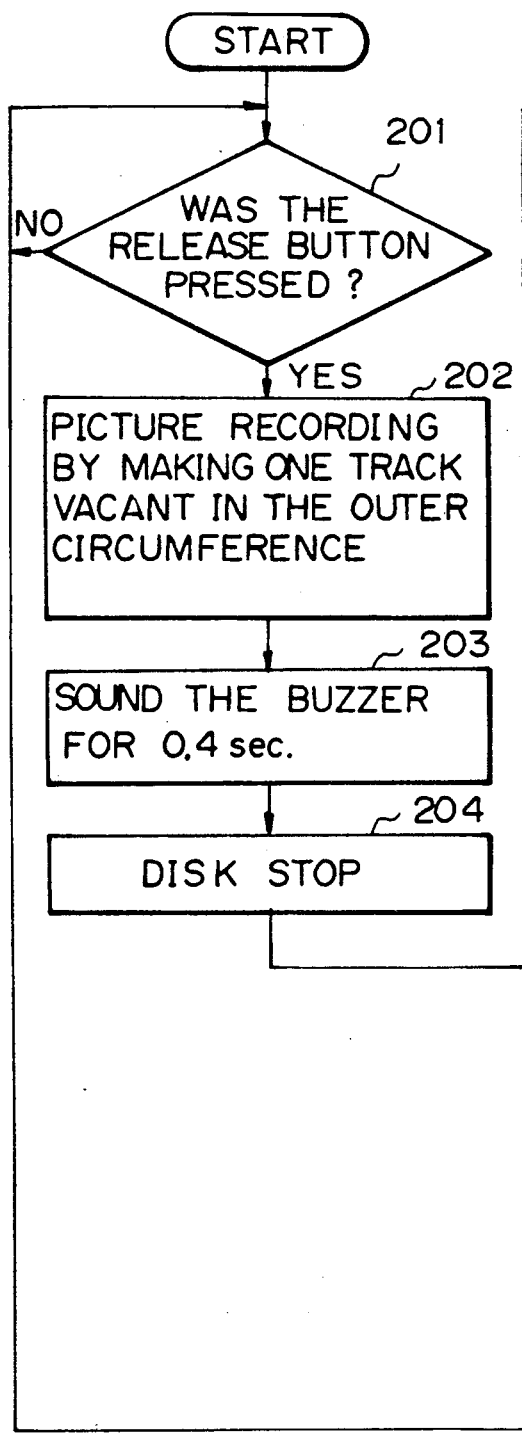
FIGS. 8A and 8B comprise a flow chart which are useful in understanding the operation of the camera system controller for recording an audio signal immediately after a still video picture signal is recorded.
Figure 8B:
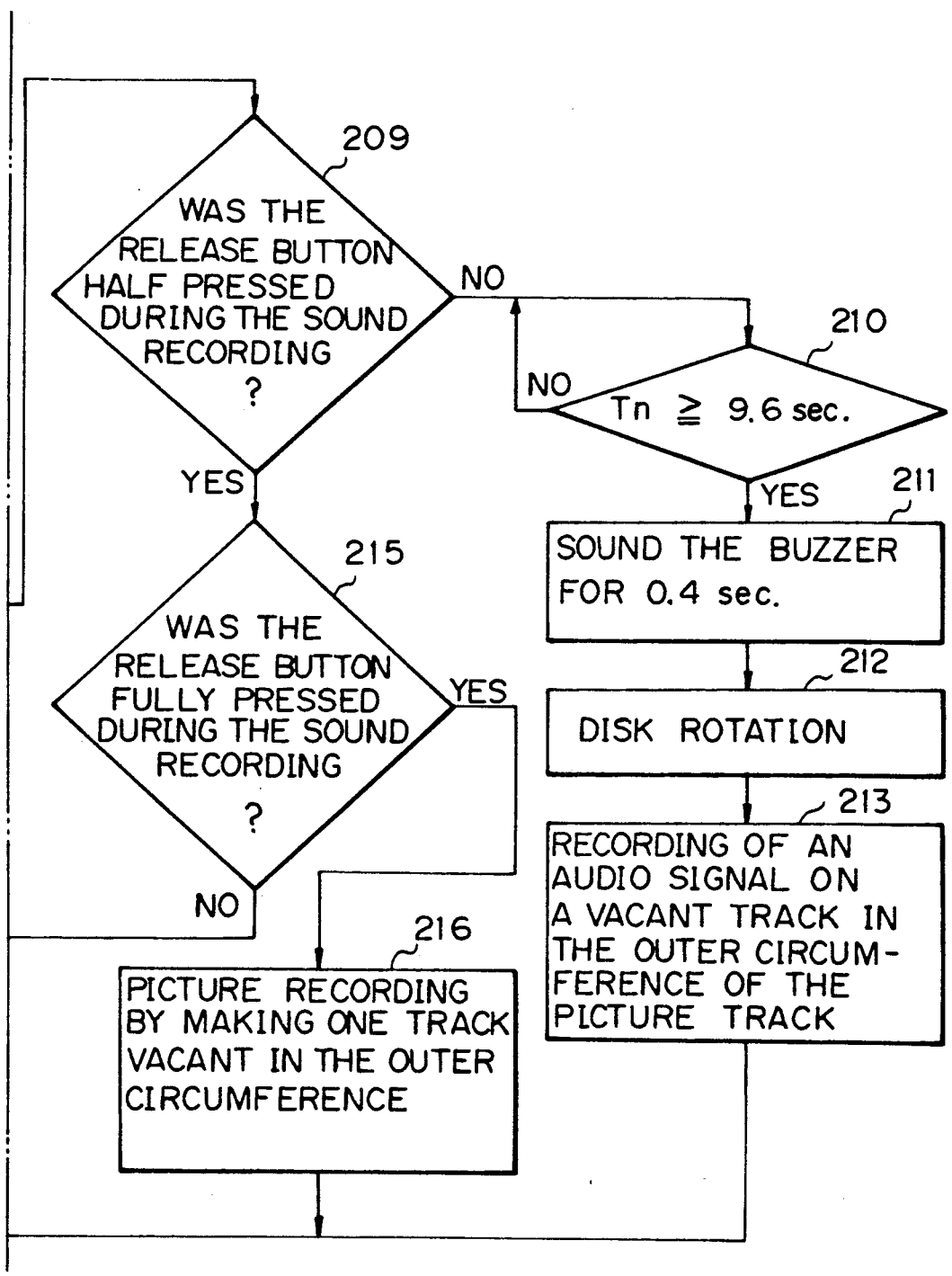

When carrying out the routine illustrated in FIGS. 8A and 8B, inquiry 201 first is made to determine if shutter release button 18 had been pressed. If not, the controller simply cycles through inquiry 201 until either the shutter release button is operated or another routine is called. When inquiry 201 is answered in the affirmative, the controller advances to instruction 202 to record a still video picture in an available track on disk 41, and the next track adjacent the outer circumference of this video track is made available for after-recording of an audio signal.

The controller then advances to instruction 203 by which an audible warning indication is provided for a predetermined period of time, such as the aforementioned 0.4 seconds interval. As before, this provides sufficient warning to the user that the audio recording operation is about to begin. Then, the controller advances to instruction 204 to terminate the operation of the disk drive, thus stopping the rotation of disk 41. It is recalled that by deactivating the disk drive, undesired mechanical noises will not mix with the audio signal to be recorded.

Then, the routine advances to instruction 205 which imparts a 0.4 second delay into the actual recording operation. This delay permits the disk drive to be deactivated and also gives the user sufficient time to release shutter release button 18 and to prepare to record an audible message. At the end of this delay, instruction 206 is carried out by which a timer is reset to an initial count of $T_n=0$. Then, instruction 207 is executed to carry out a sound recording operation. Here, the sound recording operation is assumed to emanate from the built-in microphone.

While this audio recording operation is being carried out, that is, while the audio signal is being digitized, stored, time-compressed and recorded, the controller inquires, at 208, if recording switch 12 is operated while the audio signal is in the process of being written, read or recorded. If this inquiry is answered in the affirmative, the controller advances to instruction 214 to erase the outer track adjacent the track in which the associated still video picture signal had been recorded. Referring to FIG. 7A, if an audio signal associated with the still video picture signal recorded in track $V_{11}$ is in the process of being recorded, adjacent outer track $A_{11}$ which is reserved for this audio signal is erased. If no audio signal had been recorded, such as is the case presently being described, the track simply is prepared for recording a new audio signal. The controller then returns to inquiry 201 to repeat the operation discussed above.

If inquiry 208 had been answered in the negative, that is, if recording switch 12 is not operated while an audio signal is in the process of being recorded, the controller advances to FIG. 8B and inquiry 209. This inquiry determines if shutter release button 18 had been partially operated while the audio signal is in the process of being written, read or recorded. If so, inquiry 215 determines if the shutter release button is fully depressed. If this inquiry is answered in the negative, the controller returns to instruction 214 to erase the outer track adjacent the track in which the associated still video picture had been recorded, as was discussed above. Thus, this track is erased if either recording switch 12 or shutter release button 18 is operated before the audio signal is fully recorded.

If inquiry 215 is answered in the affirmative, that is, if the shutter release button is fully depressed while an audio signal is in the process of being recorded, the audio signal recording operation is bypassed by advancing to instruction 216. This instruction advances head 44 radially inwardly to reserve a track for after-recording of an audio signal and then the head is moved further inwardly to the next adjacent track for recording a still video picture signal therein. Thus, if the user of camera 1 is presented with a photographic opportunity while he is in the process of creating an audible message, the audio recording operation is bypassed and a still video picture may be taken of that photographic opportunity. Of course, since selector switch 11 is in its simultaneous recording position, this immediate recording of a new still video picture signal nevertheless reserves an adjacent track in which an audio signal may be after-recorded. After recording this still video picture signal, the controller returns to inquiry 201.

If neither recording switch 12 nor shutter release button 18 is operated, inquiries 208 and 209 both are answered in the negative. The controller then advances to inquiry 210 (FIG. 8B) to determine if the timer $T_n$ has reached a predetermined time-out value. In the preferred embodiment, as mentioned above, this predetermined value is on the order of about 9.6 seconds to permit the recording of an audio message of 9.6 seconds duration. If the timer has not yet timed out, the illustrated routine cycles through inquiry 210, as illustrated. However, once the timer times out, another audible indication is provided, at 9 instruction 211, for a duration on the order of about 0.4 seconds. At this time, the audio signal is about to be read from memory 90 and, thus, the audible sound emanating from, for 12 example, buzzer 46 is not written into the memory.

Then, instruction 212 is executed to activate the disk drive and thus rotate disk 41. Once the disk reaches proper speed, the controller advances to instruction 213 to record the audio signal read from memory 90 in the track which had been reserved adjacent the track which had just been used to record the still video picture signal. It is recalled that this 19 reserved track is an outer track adjacent the just-recorded video track. Thus, after recording a frame of a still video picture, the audio signal associated with that frame and which had been produced by use of the built-in microphone is recorded in the reserved track adjacent the still video picture.

It is appreciated that, in the foregoing description, the operation of recording switch !2 or shutter release button 18 while an audio signal is in the process of being recorded may be carried out because the user is not satisfied with the message he is recording. This has been discussed above in conjunction with the flow chart shown in FIGS. 6A-6E and, in the interest of brevity, is not repeated.

The manner in which an audio signal is after-recorded while displaying a still video picture now will be described in conjunction with the flow chart shown in FIGS. 9A-9D. It is recalled that a still video picture may be displayed when adapter 21 (FIG. 3) is connected to camera 1 such that the video signal processing circuitry included in the adapter may operate upon the still video picture signal reproduced from disk 41 by head 44 in camera I. In the embodiment described herein, an audio signal is recorded while a still video picture is displayed if recording switch 12 is actuated, selector switch 11 is disposed in its after-recording or simultaneous recording mode and if the camera/adapter combination is operated in a single frame-by-frame reproduction mode. If all of these conditions are not met, the audio signal may not be recorded.

Figure 9A:
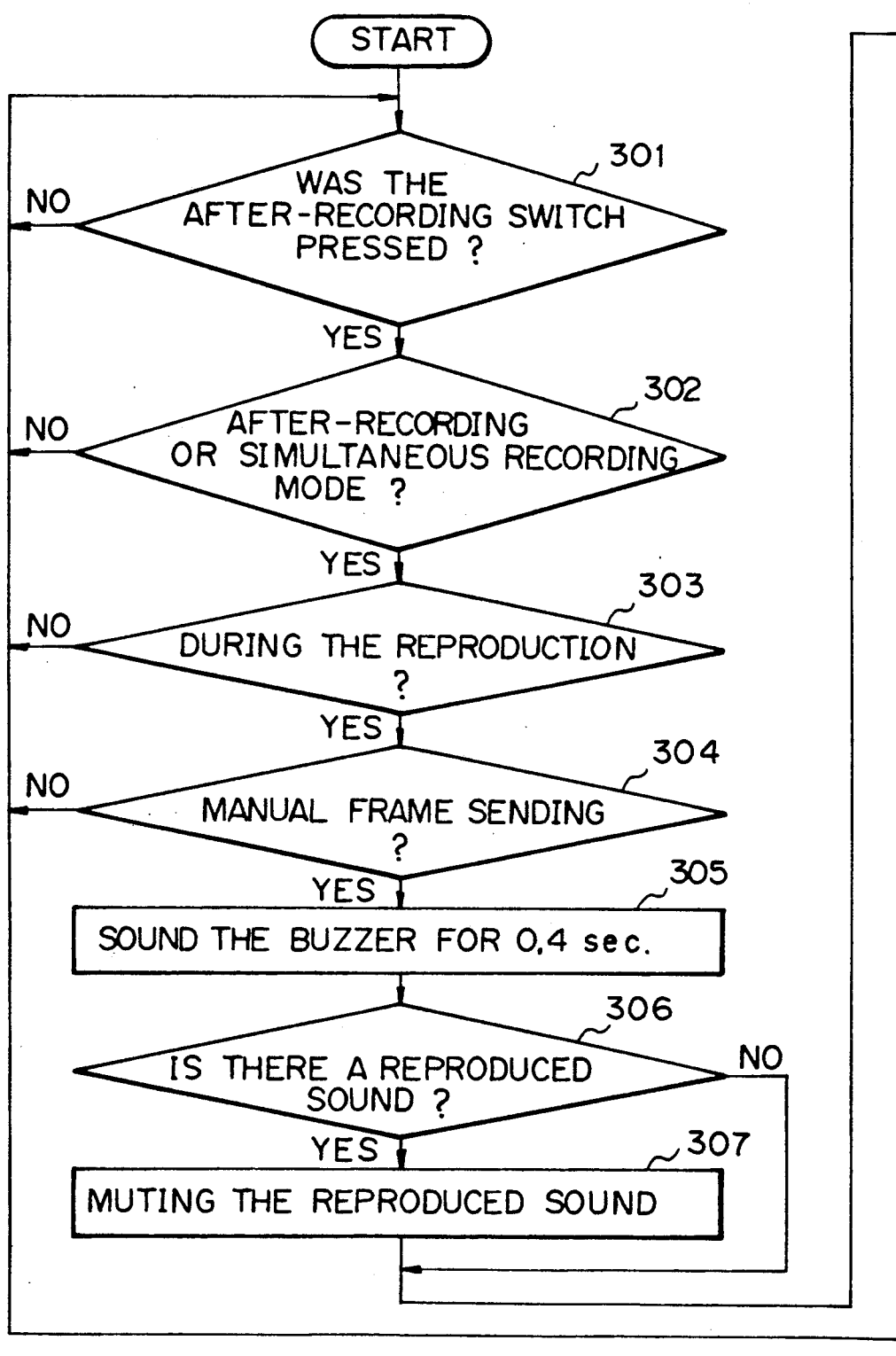

Turning to FIG. 9A, these conditions are checked by the controller which inquires, at 301, if recording switch 12 is operated. If not, the controller simply returns to the beginning of this illustrated routine. But, if inquiry 301 is answered in the affirmative, the controller advances to inquire, at 302, if selector switch 11 is disposed in its after-recording or simultaneous recording mode. If not, the controller returns to the beginning of this routine. But, if inquiry 302 is answered in the affirmative, the controller advances to inquiry 303.

Inquiry 303 determines if recording switch 12 is actuated when the camera/adapter combination is disposed in its playback mode. If not, the controller returns to the beginning of this routine. But, if inquiry 303 is answered in the affirmative, the controller advances to inquire, at 304, if the camera/adapter combination is disposed in its frame-by-frame playback mode. For example, if frame feed selector 31 of adapter 21 (FIG. 3) is operated, this inquiry is answered in the negative. Alternatively, if selector 32 is operated, this inquiry is answered in the affirmative.

If inquiries 301-304 all are answered in the affirmative, the controller advances to instruction 305 to emit an audible sound for a predetermined time period, such as on the order of 0.4 seconds. For example, buzzer 46 (FIG. 4A) may be activated. Then, the controller advances to inquire, at 306, if audio signals are reproduced from disk 41. For example, since the camera/adapter combination is disposed in its reproducing mode, if head 44 is positioned over a track in which an audio signal had been recorded previously, inquiry 306 will be answered in the affirmative. If so, this reproduced signal is muted, as represented by instruction 307 which executes a sound muting operation, then, the controller advances to FIG. 9B and inquiry 308.

Inquiry 308 determines if external microphones 38 is connected to microphone jack 4 of camera 1 (FIG. 1). If not, that is, if built-in microphone 3 is being used, the controller advances to instruction 322 of FIG. 9D. For the present discussion, let it be assumed that the external microphone is connected and, thus, inquiry 308 is answered in the affirmative. Accordingly, instruction 309 is executed, whereby a 0.4 second delay is imparted into the actual recording operation. At the end of this delay, which provides sufficient time for the user to release recording switch 12, instruction 310 is carried out by which the timer is reset to an initial count of $T_n=0$. Then, instruction 311 is executed to carry out the sound recording operation. It is appreciated that, since an external microphone is used for after-recording, mechanical noises which may be generated by the disk drive are not mixed with the audio signal produced by the external microphone.

As the second recording operation is carried out, the controller advances to inquire, at 312, if recording switch 12 is operated. It is recalled that, if the user is not satisfied with the message being recorded, he may operate recording switch 12 to terminate the audio recording operation and record a new audio signal. Let it be assumed that inquiry 312 is answered in the negative. Accordingly, the controller advances to FIG. 9C and inquiry 313 which determines if the timer $T_n$ has reached its predetermined time-out value. Consistent with the foregoing description, it is assumed that this predetermined value is on the order of about 9.6 seconds. If the timer has not yet timed out, the illustrated routine cycles through inquiry 313, as illustrated. However, once the timer times out, another audible indication is provided, at instruction 314, to apprise the user that the duration during which he may speak his message has expired.

Then, instruction 315 is carried out to mute the still video picture being displayed. It is recalled that, at this time, head 44 was in the process of reproducing the still video picture signal from a pre-recorded video track. To record an audio signal, the head now must be moved to an available track in which the audio signal will be recorded. Consequently, the still video picture no longer will be displayed. Instruction 315 prevents undesired interference or video "noise" from being displayed to the user. Then, inquiry 316 is made to determine if a track had been reserved for the recording of an audio signal associated with this reproduced still video picture signal. The manner such tracks are reserved has been above. If inquiry 316 is answered in the affirmative, the controller advances to instruction 317 to read the audio signal from memory 90 (FIG. 4B) and to record that audio signal in the reserved track. That is, the time-compressed audio signal is written to the track which is associated with the video picture signal that had been displayed. After the time-compressed audio signal is written to the disk, instruction 318 is executed to return head 44 to the track from which the still video picture signal had been reproduced, and this still video picture signal once again is played back and displayed. The controller then returns to the beginning of the routine illustrated in FIG. 9A.

Let it be assumed that a track had not been reserved previously for the recording of an audio signal associated with the still video picture signal being reproduced. In that event, inquiry 316 (FIG. 9C) is answered in the negative; and the controller advances to inquiry 319. This inquiry determines if a vacant outer track adjacent the track from which this still video picture is being reproduced is present. If there is such an adjacent outer track, that is, if such a track is not already occupied with a video or audio signal, inquiry 319 is answered in the affirmative and the controller advances to instruction 320 to record the time-compressed audio signal in that track. Then, instruction 318 is carried out, whereby the still video picture signal which had been reproduced prior to the recording of this audio signal is reproduced once again.

If inquiry 319 is answered in the negative, that is, if an outer adjacent track is not available (i. e. vacant) for recording the time-compressed audio signal, the controller advances to instruction 321. As indicated, this instruction commands the recording of the time-compressed audio signal in an inner track adjacent the video track from which the still video picture signal had been reproduced. Then, instruction 318 is carried out, whereby head 44 returns to the video track from which the previously reproduced still video picture signal was played back.

Figure 9C:
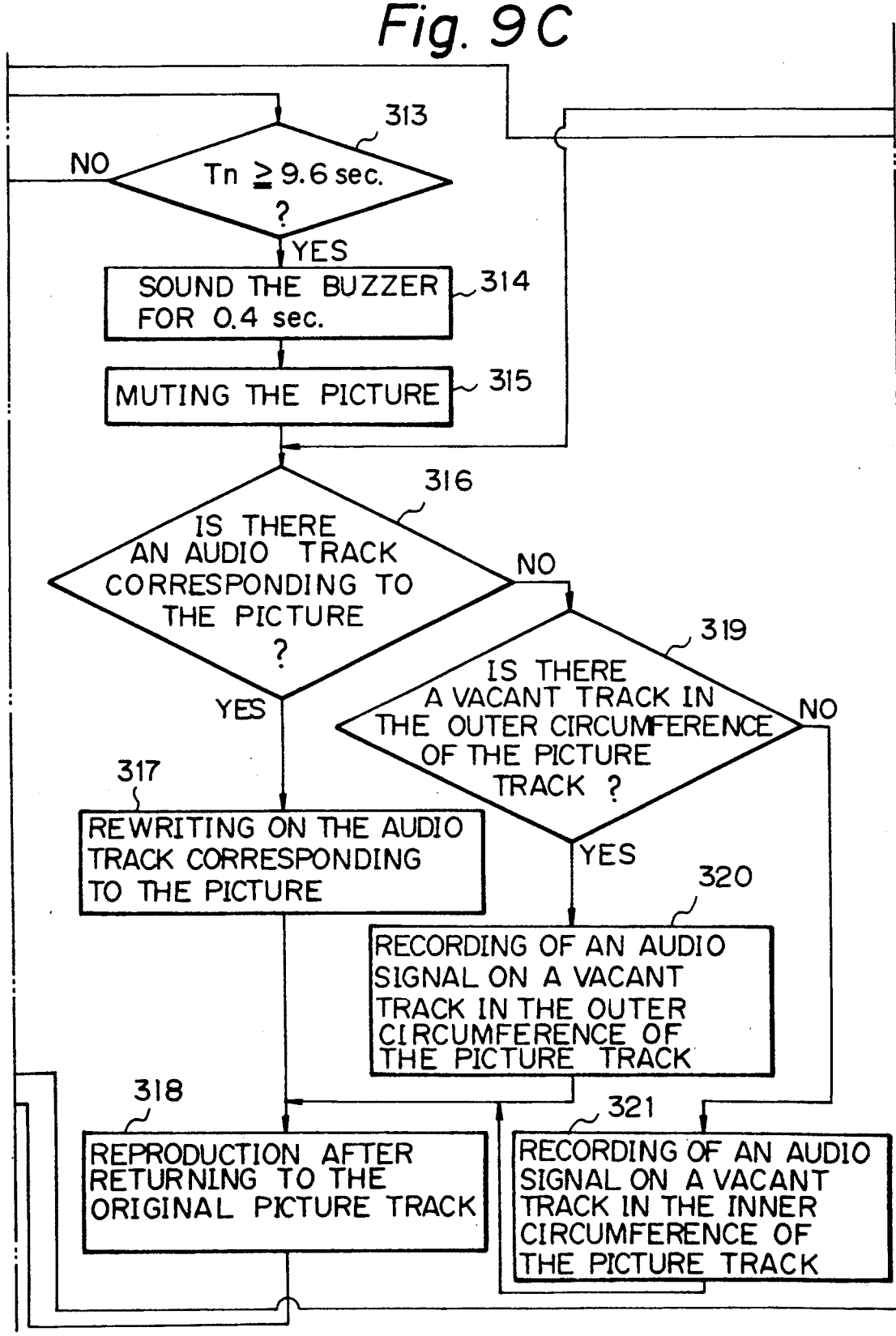
Figure 9D:
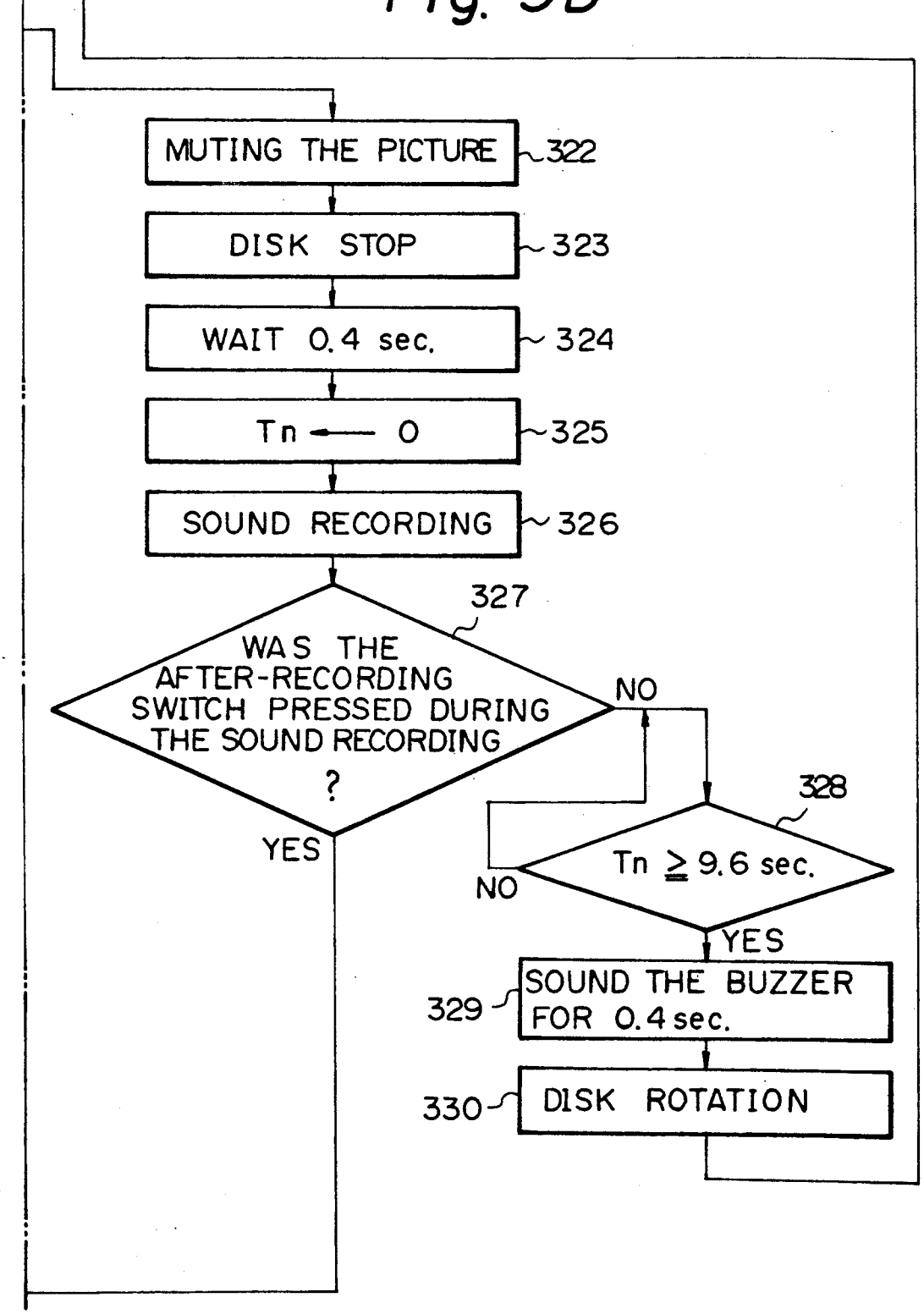

In one embodiment for implementing the routine shown in FIG. 9C, instructions 320 and 321 are carried out to record a time-compressed audio signal in a track adjacent the video track from which the subject still video picture signal is reproduced. In an alternative embodiment, the time-compressed audio signal is recorded in any vacant track, either radially outward of the video track, as called for by instruction 320, or radially inward of that track, as called for by instruction 321.

The foregoing discussion has assumed that an external microphone is connected to camera 1. If, however, the internal microphone is used, inquiry 308 (FIG. 9B) is answered in the negative; and the controller then advances to the routine illustrated in FIG. 9D. Here, 322 executed to mute the reproduced still video picture. It is appreciated that this instruction is similar to instruction 315 and is carried out for the same purpose.

Thereafter, instruction 323 is carried out to deenergize the disk drive. This prevents the mixing of mechanical noises from the disk drive with the audio signal to be produced by the user and recorded via the internal microphone. Thereafter, instruction 324 imparts a delay of, for example, 0.4 seconds. This delay is sufficient for the disk drive to come to a stop. If desired, any other suitable time delay may be used. This delay also provides sufficient time for the user to release recording switch 12. At the end of this delay, instruction 325 is carried out by which the timer is reset to its initial count of $T_n=0$. Then, instruction 326 is executed to carry out the sound recording operation.

Should the user not be satisfied with the message he is in the process of recording, he may actuate recording switch 12. Inquiry 327 is made to determine if this recording switch is operated at any time during the audio recording operation. If so, this recording operation is terminated and the controller returns to the beginning of the routine illustrated in FIG. 9A. The user then may record a new audio signal, if he desires.

If inquiry 327 is answered in the negative, the controller advances to inquire, at 328, if the timer $T_n$ has reached its predetermined time-out value. Consistent with the examples discussed above, this predetermined value is on the order of about 9.6 seconds. Once the timer times out, another audible indication is provided, at instruction 329. At this time, the audio signal is about to be read from memory 90 (FIG. 4B) and, thus, disk rotation must be restarted. Hence, instruction 330 is executed to re-energize the disk drive. The controller then returns to inquiry 316 (FIG. 9C) to continue with the illustrated routine which has been discussed above. That is, the audio signal which had been recorded by way of the built-in microphone now is recorded on either a reserved track or on a vacant track that is radially outward or radially inward of the video track from which the still video picture signal had been reproduced. After the audio signal is recorded, that is, after it is read from memory 90 to disk 41, the controller returns to the beginning of the routine illustrated in FIG. 9A.

If recording switch 12 is operated during the audio recording operation, that is, if this switch is operated at any time while the audio signal is being written to memory 90, read therefrom or written to disk 41, the controller advances to inquiry 331 in FIG. 9B. That is, if inquiry 312 or inquiry 327 is answered in the affirmative, inquiry 331 is made. This inquiry determines if an audio track had been reserved for recording this audio signal. If inquiry 331 is answered in the affirmative, instruction 332 is carried out to erase any signal that may have been recorded. That is, the reserved audio track is made ready for the recording of a new audio signal which now is expected. However, if inquiry 331 is answered in the negative, that is, if an audio track had not been reserved, instruction 332 simply is bypassed.

The controller then returns to the beginning of the routine illustrated in FIG. 9A. The user then may record a new audio signal in accordance with the routine discussed above.

While the present invention has been particularly shown and described with reference to preferred embodiments, it will be readily appreciated by those or ordinary skill in the art that various changes may be made without departing from the spirit and scope of the invention. For example, the numerical examples discussed above are intended to be merely illustrative. Other nominal time delays may be used to establish a message length interval and delay periods, for the purposes discussed above. Furthermore, it is appreciated that the determination of whether tracks had been reserved for the recording of an audio signal when a still video picture signal is recorded, or whether vacant tracks are present for accommodating an audio signal may be determined from index table 143 which is produced when flag control and code information is recovered from the disk during a playback operation.

It is intended that the appended claims be interpreted as including the embodiments discussed above and all equivalents thereto.

What is claimed is:

1. Apparatus for recording a still video picture signal and an audio signal on a disk, comprising: after-recording switch means manually operable after a still video picture signal is recorded to initiate the recording of an audio signal on said disk; and control means responsive to the operation of said after-recording said audio signal on said disk, said control means including means for re-commencing an audio recording operation if said after-recording switch means is operated again before the completion of a preceding audio recording operation.

2. The apparatus of claim 1 wherein said control means further includes delay means for delaying the recording of said audio signal for a predetermined time interval following the operation of said after-recording switch means.

3. The apparatus of claim 1 wherein said control means comprises input means for receiving said audio signal, time compression means coupled to said input means for time compressing the received audio signal and recording means for recording the time compressed audio signal on said disk.

4. The apparatus of claim 3 wherein said recording means includes video signal recording means for recording a still video picture signal on a track on said disk, and audio signal recording means for recording the time compressed audio signal on an adjacent track on said disk.

5. The apparatus of claim 4 wherein said control means includes video mode select means operable to select a one-picture recording mode for recording signals representing one still video picture in a track or a continuous recording mode for recording signals representing successive still video pictures in successive tracks; and wherein said audio signal recording means is responsive to said one-picture recording mode to record the time compressed audio signal in a track adjacent the track in which said signals representing one still video picture are recorded and said audio signal recording means is responsive to said continuous recording mode to record the time compressed audio signal in a track adjacent the first of said successive tracks.

6. The apparatus of claim 3 wherein said means for re-commencing an audio recording operation includes sense means for sensing if said after-recording switch means is operated during the reception, time compression or recording of the audio signal to re-commence the recording of a new audio signal.

7. The apparatus of claim 3 wherein said control means further includes warning means for providing a first warning to a user for a first period of time before an audio signal is received by said input means and a second warning for a second period of time before the time compressed audio signal is recorded on said disk.

8. The apparatus of claim 4 wherein said control means further includes erase means responsive to a subsequent operation of said after-recording switch means while an audio signal is being recorded to erase said adjacent track on said disk in preparation for recording a new audio signal in said adjacent track.

9. The apparatus of claim 8, further including release switch means manually operable to initiate the recording of a still video picture signal on a track; and wherein said erase means is additionally responsive to the operation of said release switch means while an audio signal is being recorded to erase said adjacent track.

10. The apparatus of claim 9 wherein said release switch means exhibits first and second operating states, said erase means being responsive to said first operating state and said control means additionally including means responsive to said second operating state to override the recording of an audio signal and to commence the immediate recording of a still video picture signal.

11. The apparatus of claim 3, further comprising disk drive means for rotating said disk to record the time compressed audio signal thereon, and means for inhibiting the disk drive means while an audio signal is applied to said input means, thereby minimizing the mixture of noise with said audio signal.

12. The apparatus of claim 1 further comprising audio signal recording means for recording an audio signal on the disk; a built-in microphone for supplying the audio signal to be recorded; external microphone connection means for receiving an external microphone to supply the audio signal to be recorded; and selector switch means operable to couple the built-in microphone on the external microphone to said audio signal recording means.

13. The apparatus of claim 12, further comprising video playback means for playing back a still video picture signal from the disk, and disk drive means for rotating the disk such that a still video picture signal is played back therefrom; and wherein said control means comprises switch sensing means for sensing the operation of said selector switch means, and disk drive control means for controlling the disk drive means in response to the sensed operation of said selector switch means.

14. The apparatus of claim 13 wherein said audio signal recording means includes memory means for temporarily storing an audio signal written thereinto for recording; and said disk drive control means includes means for terminating the operation of said disk drive means in response to the operation of said after-recording switch means if said selector switch means is sensed as coupling said built-in microphone to said audio signal recording means, whereby the disk does not rotate while said audio signal is written into said memory means, means for resuming the operation of said disk drive means after said audio signal is written into said memory means, and means for reading said audio signal from said memory means for recording on the rotating disk.

15. The apparatus of claim 14 wherein said disk drive control means further includes means for continuing the operation of said disk drive means in response to the operation of said after-recording switch means if said selector switch means is sensed as a coupling said external microphone to said audio signal recording means.

16. Apparatus for recording a still video picture signal and an audio signal on a disk, comprising: release switch means manually operable to initiate the recording of a still video picture signal on said disk; and control means responsive to the operation of said release switch means to commence a still video picture signal recording operation followed by an audio signal recording operation, said control means including means for interrupting the audio signal recording operation to record another still video picture signal if said release switch means is operated again before the completion of said audio signal recording operation.

17. The apparatus of claim 16 further comprising disk drive means; and wherein said control means further includes switch sensing means for sensing partial operation of said release switch means for energizing said disk drive means to rotate said disk in preparation for recording a still video picture signal thereon.

18. The apparatus of claim 16 wherein said means for interrupting includes erase means responsive to the operation of said release switch means while an audio signal is being recorded to erase that audio signal and enable a new audio signal to be recorded on the disk.

19. The apparatus of claim 18 wherein said control means further includes video signal recording means for recording a still video picture signal on a track on said disk, and audio signal recording means for recording an audio signal on an adjacent track on said disk.

20. The apparatus of claim 19 wherein said release switch means exhibits first and second operating states, said erase means being responsive to said first operating state for erasing said adjacent track; and said control means additionally including means responsive to said second operating state to override an audio signal recording operation and commence the immediate recording of still video picture, signal.

21. The apparatus of claim 16 wherein said means for interrupting includes override means responsive to the operation of said release switch means while an audio signal is being recorded on said disk to terminate the audio signal recording operation and commence immediately a video signal recording operation.

22. The apparatus of claim 16 wherein said control means comprises disk drive means for rotating said disk to record video and audio signals thereon; means for terminating the operation of said disk drive means after a still video picture signal is recorded; input means for receiving an audio signal to be recorded after the operation of said disk drive means terminates; time compression means coupled to said input means for time compressing the received audio signal; means for restarting the operation of said disk drive means; and audio recording means for recording the time compressed audio signal on said disk.

23. The apparatus of claim 22 wherein said control means further comprises delay means for delaying said input means for a predetermined time interval after the operation of said disk drive means terminates.

24. The apparatus of claim 22 further including a housing to contain at least said disk drive means and said disk, and wherein said input means comprises a microphone built into said housing.

25. The apparatus of claim 22 wherein said time compression means includes memory means for temporarily storing an audio signal written thereinto for recording, and wherein said means for interrupting includes means responsive to partial operation of said release switch means before said audio signal is recorded to condition said memory means to store a new audio signal.

26. The apparatus of claim 16 wherein said control means includes means for reserving a track on said disk for the recording of an audio signal therein associated with the still video picture signal recorded in response to the operation of said release switch means.

27. Apparatus for reproducing a still video picture signal from a disk and thereafter recording an audio signal on the same disk, comprising: recording switch means operable to establish an audio signal recording mode; a built-in microphone for supplying an audio signal for recording; connection means for connecting an external microphone to supply an audio signal for recording; sense means for sensing the connection of an external microphone; and control means operable when said recording switch means is operated and responsive to said sense means for delaying the recording of an audio signal on said disk when the connection of an external microphone is not sensed and for recording an audio signal on said disk directly when the connection of an external microphone is sensed.

28. The apparatus of claim 27 wherein said control means comprises memory means for temporarily storing the supplied audio signal; write-in means for writing an audio signal into said memory means; read means for reading the stored audio signal from said memory means; and recording means for recording the read audio signal on said disk.

29. The apparatus of claim 28 wherein said recording means is operable to record the read audio signal on a track adjacent the track from which the still video picture signal is reproduced.

30. The apparatus of claim 28 wherein said recording means includes disk drive means operative to rotate said disk to reproduce said still video picture signal and to record the read audio signal; and wherein said control means comprises interrupt means for interrupting the operation of said disk drive means if the connection of an external microphone is not sensed while an audio signal is written into said memory means, and means for resuming the operation of said disk drive means while reading the audio signal from said memory means to said recording means.

31. The apparatus of claim 30 wherein said control means further comprises bypass means for bypassing said interrupt means if the connection of an external microphone is sensed, whereby said audio signal is written into and read from said memory means while said disk drive means is operating.

32. The apparatus of claim 31 wherein said control means includes means for determining if a reserved audio track associated with a video track from which the still video picture signal is reproduced is present on said disk, means for recording the audio signal read from said memory means in said reserved audio track, and means for recording the audio signal read from said memory means in a track adjacent said video track if said reserved track is not present.

33. The apparatus of claim 28 wherein said control means includes means for sensing subsequent operation of said recording switch means before the stored audio signal is read from said memory means to condition said memory means to store a new audio signal.

34. The apparatus of claim 33 wherein the audio signal read from said memory means is recorded in an audio track on said disk associated with a track from which the still video picture signal is reproduced; and said control means further includes means for erasing said audio track when the subsequent operation of said recording switch means is sensed.

35. The apparatus of claim 28 wherein said read means operates at a faster rate than said write-in means to time compress the audio signal.

* * * * *